US011847258B2

(12) United States Patent
Myung et al.

(10) Patent No.: US 11,847,258 B2
(45) Date of Patent: Dec. 19, 2023

(54) METHOD FOR WIRELESS CONNECTION IN AUGMENTED REALITY ENVIRONMENT AND ELECTRONIC DEVICE THEREFOR

(71) Applicant: SAMSUNG ELECTRONICS CO., LTD., Suwon-si (KR)

(72) Inventors: Insik Myung, Suwon-si (KR); Shinjae Jung, Suwon-si (KR); Inyoung Choi, Suwon-si (KR); Hoon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 122 days.

(21) Appl. No.: 17/520,946

(22) Filed: Nov. 8, 2021

(65) Prior Publication Data

US 2022/0155861 A1 May 19, 2022

Related U.S. Application Data

(63) Continuation of application No. PCT/KR2021/012673, filed on Sep. 16, 2021.

(30) Foreign Application Priority Data

Nov. 17, 2020 (KR) .................. 10-2020-0153484

(51) Int. Cl.
*G06F 3/01* (2006.01)
*G06T 19/00* (2011.01)

(52) U.S. Cl.
CPC .............. *G06F 3/013* (2013.01); *G06F 3/011* (2013.01); *G06T 19/006* (2013.01)

(58) Field of Classification Search
None
See application file for complete search history.

(56) References Cited

U.S. PATENT DOCUMENTS 8,893,164 B1 11/2014 Teller
9,208,516 B1 12/2015 Teller
(Continued)

FOREIGN PATENT DOCUMENTS

JP            6598617        3/2017
KR    10-2014-0029901        3/2014
(Continued)

OTHER PUBLICATIONS

Search Report dated Jan. 3, 2022 in counterpart International Patent Application No. PCT/KR2021/012673.

*Primary Examiner* — Jwalant Amin
(74) *Attorney, Agent, or Firm* — Nixon & Vanderhye P.C.

(57) ABSTRACT

There is disclosed an augmented reality (AR) glasses device including: a camera, a transparent display, a communication circuit, a memory storing images of a plurality of external electronic devices, and a processor. The processor may be configured to control the AR glasses device to: acquire an image including an image of at least one external electronic device, acquire running application information of the at least one external electronic device, identify a first external electronic device corresponding to a gaze from among the at least one external electronic device from the acquired image, determine whether a specified application is running in the first external electronic device based on the running application information, and connect to the first external electronic device using a communication circuit, based on the specified application running.

18 Claims, 18 Drawing Sheets

(56) References Cited

U.S. PATENT DOCUMENTS

| | | | |
|---|---|---|---|
| 9,223,402 B2 | 12/2015 | Cho | |
| 9,420,352 B2 | 8/2016 | Teller | |
| 9,897,808 B2 | 2/2018 | Yoo | |
| 10,001,844 B2 | 6/2018 | Namba et al. | |
| 10,318,225 B2 | 6/2019 | Kaufthal | |
| 10,451,874 B2* | 10/2019 | Kimura | G06F 1/163 |
| 10,664,218 B2 | 5/2020 | Kaufthal | |
| 2014/0062854 A1* | 3/2014 | Cho | G06F 3/016 |
| | | | 345/156 |
| 2016/0066060 A1 | 3/2016 | Teller | |
| 2017/0060514 A1 | 3/2017 | Kaufthal | |
| 2017/0083104 A1 | 3/2017 | Namba et al. | |
| 2017/0199570 A1 | 7/2017 | Kwon et al. | |
| 2017/0277257 A1* | 9/2017 | Ota | G02B 27/017 |
| 2017/0374486 A1* | 12/2017 | Killham | H04R 5/02 |
| 2019/0227694 A1 | 7/2019 | Shin et al. | |
| 2019/0361140 A1* | 11/2019 | Lee | G06F 3/002 |
| 2019/0384389 A1 | 12/2019 | Kim et al. | |
| 2021/0072877 A1 | 3/2021 | Kim et al. | |

FOREIGN PATENT DOCUMENTS

| | | |
|---|---|---|
| KR | 10-2015-0003591 | 1/2015 |
| KR | 10-2015-0136245 | 12/2015 |
| KR | 2016-0118163 | 10/2016 |
| KR | 10-2019-0089627 | 7/2019 |
| KR | 10-2019-0103094 | 9/2019 |
| KR | 10-2019-0109337 | 9/2019 |
| KR | 10-2020-0066419 | 6/2020 |

\* cited by examiner

METHOD FOR WIRELESS CONNECTION IN AUGMENTED REALITY ENVIRONMENT AND ELECTRONIC DEVICE THEREFOR

CROSS-REFERENCE TO RELATED APPLICATIONS

This application is a continuation of International Application No. PCT/KR2021/012673 designating the United States, filed on Sep. 16, 2021, in the Korean Intellectual Property Receiving Office and claiming priority to Korean Patent Application No. 10-2020-0153484, filed on Nov. 17, 2020, in the Korean Intellectual Property Office, the disclosures of which are incorporated by reference herein in their entireties.

BACKGROUND

Field

The disclosure relates to a method for wireless connection in an augmented reality (AR) environment, and an electronic device for performing the method.

Description of Related Art

Electronic devices may provide an augmented reality (AR) environment to users. For example, electronic devices may provide an AR environment by providing a virtual object on an image of a real environment or in the real environment. Since the virtual object is provided in the real environment, a user of the electronic device may intuitively associate the real environment with the virtual object. The content immersion of the user may be increased through the AR environment.

The electronic device may be a head-mounted display (HMD) device that may be mounted on a user's head. The electronic device may have a shape similar to glasses. The electronic device may provide an image to the user through at least a partial region of the lens of the glasses. The user may experience the AR environment by viewing the external environment through the lens of the electronic device.

An HMD device similar to glasses (e.g., augmented reality (AR) glasses) may include a display positioned close to a wearer's eyeball. Therefore, the HMD device may provide a large-sized image to the wearer with only a relatively small-sized display. However, because the display may have relatively small size and positioned in proximity to the eyeball of the wearer, the display of the HMD device may not receive a touch input. In addition, since the HMD device is worn on the wearer's head, the HMD device may be designed to have a relatively small size and small weight. Due to such physical limitations, the HMD device may have a relatively limited input interface compared to a device such as a smartphone.

The user of the HMD device may wish to output the content of the HMD through another device. For example, the user may wish to wirelessly connect the HMD device to another device and output the content of the HMD on another device through the wireless connection. In this case, the user may have to search for another device to be connected and perform an input for connecting the other device. The limited input interface of the HMD device may make the user difficult to select a device to be connected.

SUMMARY

Embodiments of the disclosure may provide an electronic device and a method for addressing the above-described problems.

According to an example embodiment of the present disclosure, there is provided an augmented reality glasses (AR) glasses device including: a camera, a transparent display, a communication circuit, a memory storing images of a plurality of external electronic devices, and a processor connected to the camera, the transparent display, the communication circuit, and the memory, wherein the processor is configured to control the glasses device to: acquire an image including an image of at least one external electronic device using the camera, acquire running application information of the at least one external electronic device using the communication circuit, identify a first external electronic device corresponding to a gaze from among the at least one external electronic device from the acquired image, determine whether a specified application is running in the first external electronic device based on the running application information, and connect to the first external electronic device using the communication circuit, based on the specified application running.

According to an example embodiment of the present disclosure, there is provided a method for operating an AR glasses device including: acquiring an image corresponding to a gaze direction of a user of the AR glasses device and including an image of at least one external electronic device using a camera of the AR glasses device, acquiring running application information of the at least one external electronic device using a communication circuit of the AR glasses device, identifying a first external electronic device corresponding to a gaze from among the at least one external electronic device from the acquired image, determining whether a specified application is running in the first external electronic device based on the running application information, and connecting to the first external electronic device using the communication circuit, based on the specified application running.

The electronic device according to various example embodiments of the present disclosure may establish a wireless connection conforming to the user's intention by connecting to an external electronic device based on the gaze of the user.

The electronic device according to various example embodiments of the present disclosure may establish a wireless connection conforming to a user context by connecting to an external electronic device based on an application executed in the external electronic device.

The electronic device according to various example embodiments of the present disclosure may improve a user experience by reducing a user input for wireless connection.

Besides, various effects may be provided that are directly or indirectly identified through the present disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With respect to the description of the drawings, the same or similar reference signs may be used for the same or similar elements.

DETAILED DESCRIPTION

Hereinafter, various example embodiments of the disclosure will be described with reference to the accompanying drawings. However, this is not intended to limit the present disclosure to the specific embodiments, and it is to be understood to include various modifications, equivalents, and/or alternatives of various example embodiments of the present disclosure.

Figure 1:
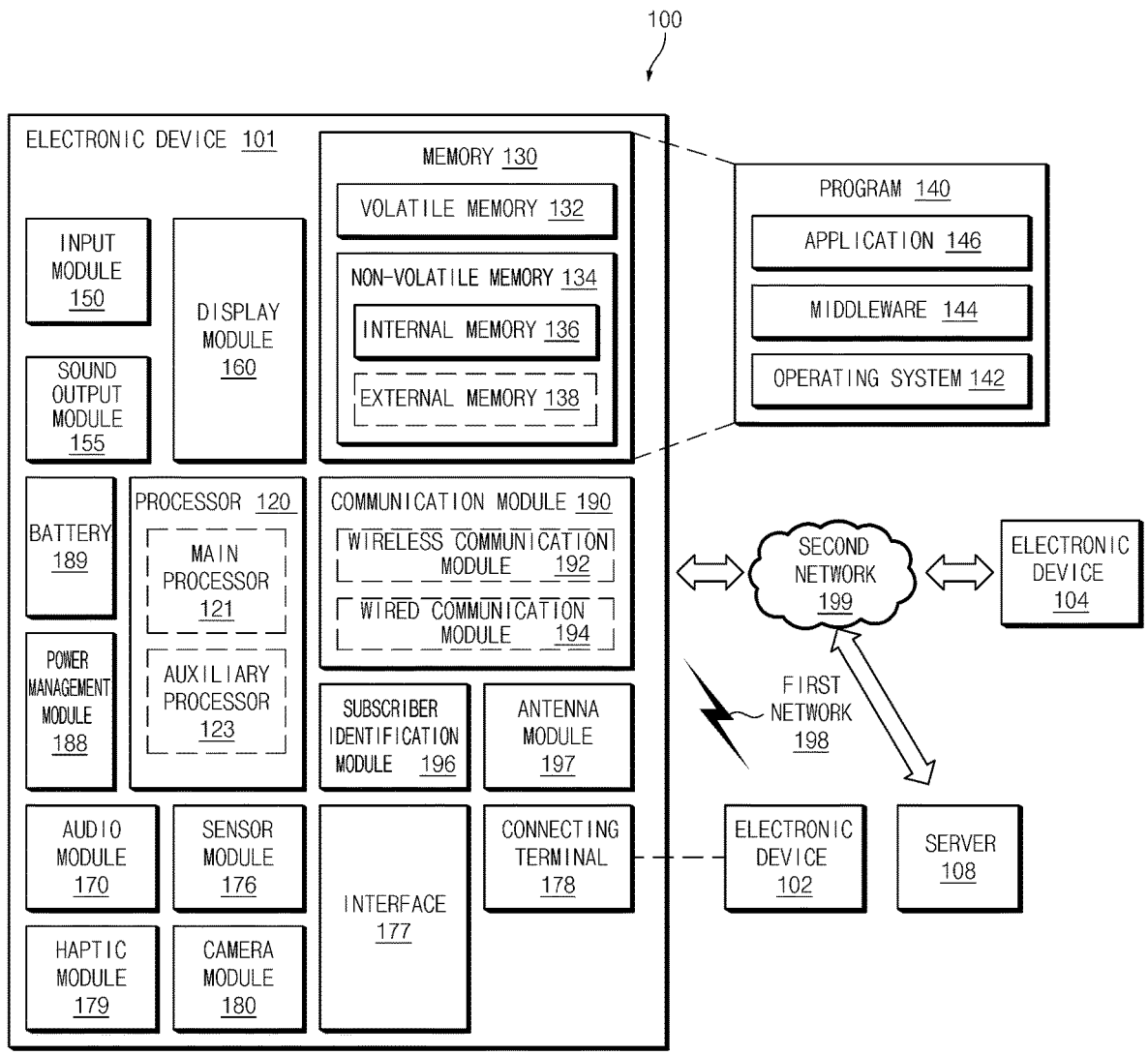
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
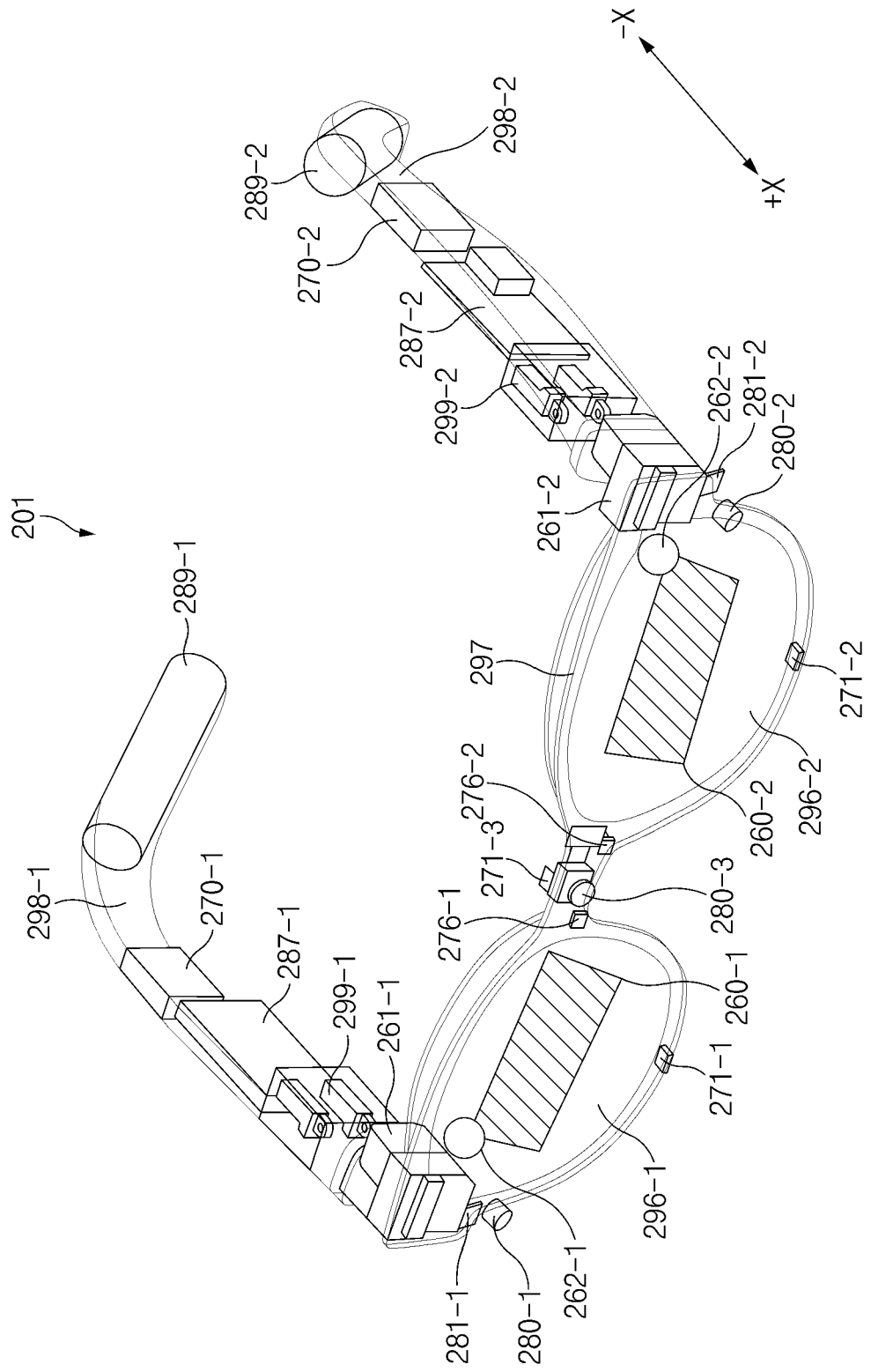
FIG. 2 is a diagram illustrating an example electronic device according to various embodiments.

FIG. 2 is a diagram illustrating an example electronic device 201 according to various embodiments.

Referring to FIG. 2, in the example of FIG. 2, the electronic device 201 may be referred to as a head-mounted display (HMD) device, a wearable device, smart glasses, eyewear, etc. The shape of the electronic device 201 illustrated in FIG. 2 is merely a non-limiting example, and embodiments of the present disclosure are not limited thereto. For example, the electronic device 201 may be any electronic device configured to provide augmented reality (AR) or virtual reality (VR).

According to an embodiment, the electronic device 201 may include at least some of components of the electronic device 101 of FIG. 1. For example, the electronic device 201 may include a display (e.g., the display module 160 of FIG. 1), a camera (e.g., the camera module 180 of FIG. 1), at least one sensor (e.g., the sensor module 176 of FIG. 1), a processor (e.g., the processor 120 of FIG. 1), a battery (e.g., the battery 189 of FIG. 1), a memory (e.g., the memory 130 of FIG. 1), or a communication circuit (e.g., the communication module 190 of FIG. 1). At least some of the components of the electronic device 201 may be located inside the housing of the electronic device 201 or may be exposed to the outside of the housing.

The electronic device 201 may include the display. For example, the electronic device 201 may include a first display 261-1 and/or a second display 261-2. The first display 261-1 and/or the second display 261-2 may include, for example, and without limitation, at least one of a liquid crystal display (LCD), a digital mirror device (DMD), a liquid crystal on silicon device (LCoS device), an organic light emitting diode (OLED), or a micro light emitting diode (micro LED). For example, the display of the electronic device 201 may include at least one light source for emitting light. If the first display 261-1 and/or the second display 261-2 includes one of a liquid crystal display device, a digital mirror device, or a liquid crystal on silicon device, the electronic device 201 may include at least one light source for irradiating (a) screen output area(s) 260-1 and/or 260-2 of the display with light. For another example, if the display of the electronic device 201 may generate light by itself, the display may not include a separate light source other than the light source included in the display. If the first display 261-1 and/or the second display 261-2 includes at least one of an organic light emitting diode and a micro LED, the electronic device 201 may provide an image to the user even if it does not include a separate light source. If the display is implemented as an organic light emitting diode or a micro LED, the weight of the electronic device 201 may be reduced by omitting a separate light source.

According to an embodiment, the electronic device 201 may include a first transparent member 296-1 and/or a second transparent member 296-2. For example, if the user wears the electronic device 201, the user may see through the first transparent member 296-1 and/or the second transparent member 296-2. The first transparent member 296-1 and/or the second transparent member 296-2 may include, for example, and without limitation, at least one of a glass plate, a plastic plate, or a polymer, and may be transparent or translucent. For example, when worn, the first transparent member 296-1 may be disposed to face the user's right eye, and the second transparent member 296-2 may be disposed to face the user's left eye.

According to an embodiment, at least a portion of the first transparent member 296-1 and/or the second transparent member 296-2 may be an optical waveguide. For example, the optical waveguide may transmit an image generated by a display (e.g., the first display 261-1 and/or the second display 261-2) to the user's eyes. The optical waveguide may be formed of glass, plastic, or polymer. For example, the optical waveguide may include a nano-pattern (e.g., a polygonal or curved grating structure) formed inside or on one surface. For example, light incident to one end of the optical waveguide may be propagated inside the optical waveguide by a nano-pattern and provided to the user's eyes. For example, the optical waveguide including a freeform prism may be configured to provide incident light to the user through a reflection mirror.

According to an embodiment, the optical waveguide may include at least one of at least one diffractive element (e.g., a diffractive optical element (DOE), or a holographic optical element (HOE)) or a reflective element (e.g., a reflective mirror). The optical waveguide may guide the display light emitted from the light source to the user's eyes using at least one diffractive element or the reflective element included in the optical waveguide. For example, the diffractive element may include an input optical member (e.g., 262-1 and/or 262-2) and/or an output optical member (not shown). The first input optical member 262-1 and/or the second input optical member 262-2 may be referred to as an input grating area, and the output optical member (not shown) may be referred to as an output grating area. The input grating area may diffract or reflect light in order to transmit light output from a light source (e.g., the micro LED) to a transparent member (e.g., the first transparent member 296-1 and/or the second transparent member 296-2) of a screen display unit. The output grating area may diffract or reflect the light transmitted to the transparent member (e.g., the first transparent member 296-1 and/or the second transparent member 296-2) of the optical waveguide in the direction of the user's eyes. For example, the reflective element may include a total reflection optical element or a total reflection waveguide for total internal reflection (TIR). Total reflection may be referred to as one way of guiding light, and may refer, for example, to making an incident angle so that the light (e.g., image) input through the input grating area is reflected from one surface (e.g., the specific surface) of the optical waveguide and is transmitted to the output grating area. In an embodiment, an optical path of the light emitted from the display may be guided to the optical waveguide by the input optical member. The light moving inside the optical waveguide may be guided toward the user's eyes through the output optical member. The screen output area(s) 260-1 and/or 260-2 may be determined based on light emitted in the eye direction.

The electronic device 201 has been described as providing an image to the user using the optical waveguide in FIG. 2; however, embodiments of the present disclosure are not limited thereto. According to an embodiment, the display of the electronic device 201 may be a transparent or semi-transparent display. In this case, the display may be disposed at a position facing the user's eyes (e.g., the first screen output area 260-1 and/or the second screen output area 260-2).

According to an embodiment, the electronic device 201 may include at least one camera. For example, the electronic device 201 may include a first camera 280-1, a second camera 280-2, and/or a third camera 280-3. For example, the first camera 280-1 and the second camera 280-2 may be used for external image recognition. The first camera 280-1 and the second camera 280-2 may be configured to acquire an image corresponding to a direction (e.g., a +x direction) corresponding to the gaze of the user. The electronic device 201 may use the first camera 280-1 and the second camera 280-2 to perform head tracking (e.g., 3 degrees of freedom (DoF) or 6 degrees of freedom tracking), hand image detection, hand image tracking, and/or spatial recognition. For example, the first camera 280-1 and the second camera 280-2 may be a global shutter (GS) camera having the same specification and performance (e.g., the angle of view, shutter speed, resolution, and/or the number of color bits, or the like). The electronic device 201 may support a simultaneous localization and mapping (SLAM) technology by performing spatial recognition (e.g., 6-DOF spatial recognition) and/or depth information acquisition using stereo cameras disposed on the right and left. In addition, the electronic device 201 may recognize the user's gesture with stereo cameras disposed on the right and left. The electronic device 201 may detect a faster hand gesture and fine movement using a GS camera having relatively less distortion than a rolling shutter (RS) camera. For example, the third camera 280-3 may be used for external image recognition. The third camera 280-3 may be configured to acquire an image corresponding to a direction (e.g., the +x direction) corresponding to the gaze of the user. In an example, the third camera 280-3 may be a camera having a relatively higher resolution than that of the first camera 280-1 and the second camera 280-2. The third camera 280-3 may be referred to as a high resolution (HR) camera or a photo video (PV) camera. The third camera 280-3 may support functions for acquiring a high-quality image, such as auto focus (AF) and/or optical image stabilization (OIS). The third camera 280-3 may be a GS camera or an RS camera.

According to an embodiment, the electronic device 201 may include at least one eye-tracking sensor. For example, the electronic device 201 may include a first eye-tracking sensor 276-1 and a second eye-tracking sensor 276-2. The first eye-tracking sensor 276-1 and the second eye-tracking sensor 276-2 may be, for example, cameras configured to acquire an image in a direction corresponding to the user's eyes. The first eye-tracking sensor 276-1 and the second eye-tracking sensor 276-2 may be configured to respectively acquire the user's right eye image and the user's left eye image. The electronic device 201 may be configured to detect the user's pupil using the first eye-tracking sensor 276-1 and the second eye-tracking sensor 276-2. The electronic device 201 may acquire the gaze of the user from the user's pupil image and provide the image based on the acquired gaze. For example, the electronic device 201 may display the image so that the image is positioned in the direction of the gaze of the user. For example, the first eye-tracking sensor 276-1 and the second eye-tracking sensor 276-2 may be a global shutter (GS) camera having the same specification and performance (e.g., the angle of view, shutter speed, resolution, and/or the number of color bits, or the like).

According to an embodiment, the electronic device 201 may include at least one illumination unit. The illumination unit may include, for example, at least one LED. In FIG. 2, the electronic device 201 may include a first illumination unit 281-1 and a second illumination unit 281-2. The electronic device 201 may, for example, use the first illumination unit 281-1 and the second illumination unit 281-2 to provide auxiliary illumination for the first camera 280-1, the second camera 280-2, and/or the third camera 280-3. In an example, the electronic device 201 may provide illumination for acquiring a pupil image using the illumination unit (not shown). For example, the electronic device 201 may provide illumination to the eye-tracking sensor using an LED having an infrared wavelength. In this case, the eye-tracking sensor may include an image sensor for acquiring an infrared wavelength image.

According to an embodiment, the electronic device 201 may include at least one printed circuit board (PCB). For example, the electronic device 201 may include a first PCB 287-1 positioned in a first temple 298-1 and a second PCB 287-2 positioned in a second temple 298-2. The first PCB 287-1 and/or the second PCB 287-2 may be electrically connected to other components of the electronic device 201 through a signal line and/or a flexible PCB (FPCB). For example, the communication circuit, the memory, at least one sensor, and/or the processor may be disposed on the first PCB 287-1 and/or the second PCB 287-2. For example, each of the first PCB 287-1 and the second PCB 287-2 may include a plurality of PCBs, which are spaced apart by interposers.

According to an embodiment, the electronic device 201 may include at least one battery. For example, the electronic device 201 may include a first battery 289-1 positioned at one end of the first temple 298-1 and a second battery 289 positioned at one end of the second temple 298-2-2. The first battery 289-1 and the second battery 289-2 may be configured to supply power to components of the electronic device 201.

According to an embodiment, the electronic device 201 may include at least one speaker. For example, the electronic device 201 may include a first speaker 270-1 and a second speaker 270-2. The electronic device 201 may be configured to provide stereo sound using speakers located on the right and left.

According to an embodiment, the electronic device 201 may include at least one microphone. For example, the electronic device 201 may include a first microphone 271-1, a second microphone 271-2, and/or a third microphone 271-3. The first microphone 271-1 may be located to the right of a frame 297, the second microphone 271-2 may be positioned to the left of the frame 297, and the third microphone 271-3 may be located on a bridge of the frame 297. In an example, the electronic device 201 may perform beamforming using the first microphone 271-1, the second microphone 271-2, and/or the third microphone 271-3.

According to an embodiment, the electronic device 201 may include the first temple 298-1, the second temple 298-2, and the frame 297. The first temple 298-1, the second temple 298-2, and the frame 297 may be referred to as a housing. The first temple 298-1 may be physically connected to the frame 297 through a first hinge portion 299-1 to support the frame 297 when worn. The second temple 298-2 may be physically connected to the frame 297 through a second hinge portion 299-2 to support the frame 297 when worn.

The configurations of the above-described electronic device 201 are non-limiting examples, and embodiments of the present disclosure are not limited thereto. For example, the electronic device 201 may not include at least some of the components described with reference to FIG. 2, or may further include components other than the described components. For example, the electronic device 201 may include at least one sensor (e.g., an acceleration sensor, a gyro sensor, and/or a touch sensor) and/or an antenna.

Figure 3:
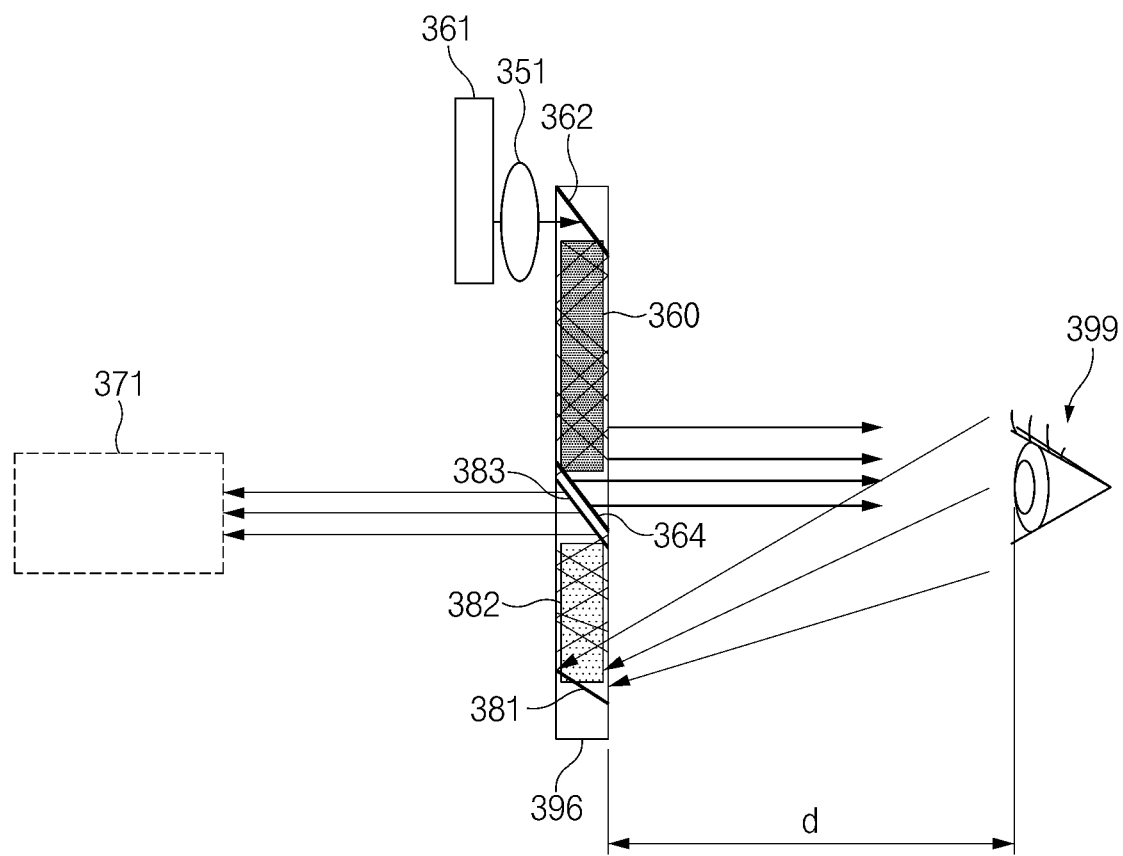
FIG. 3 is a diagram illustrating an example method for eye-tracking and display through a transparent member, according to various embodiments.

FIG. 3 is a diagram illustrating an example method for eye-tracking and display through a transparent member, according to various embodiments.

Referring to FIG. 3, a display 361 (e.g., the first display 261-1 or the second display 261-2 of FIG. 2) may provide an image through a transparent member 396 (e.g., the first transparent member 296-1 or the second transparent member 296-2 of FIG. 2). According to an embodiment, the display 361 may input light corresponding to an image to an input optical member 362 (e.g., the first input optical member 262-1 or the second input optical member 262-2 of FIG. 2) through a lens 351. The input optical member 362 may reflect or diffract the incident light and input the reflected or diffracted light into the optical waveguide 360. The output optical member 364 may output the light transmitted through the optical waveguide 360 in the direction of the user's eye 399. In an example, the lens 351 may be included in the display 361. In an example, the position of the lens 351 may be determined based on the distance between the transparent member 396 and the user's eye 399.

The eye-tracking sensor 371 (e.g., the first eye-tracking sensor 276-1 or the second eye-tracking sensor 276-2 of FIG. 2) may acquire an image corresponding to at least a part of the user's eye 399. For example, light corresponding to the image of the user's eye 399 may be reflected and/or diffracted by a first splitter 381 and input to the optical waveguide 382. The light transmitted to the second splitter 383 through the optical waveguide 382 may be reflected and/or diffracted by a second splitter 383 and output in a direction toward the eye-tracking sensor 371.

Figure 4:
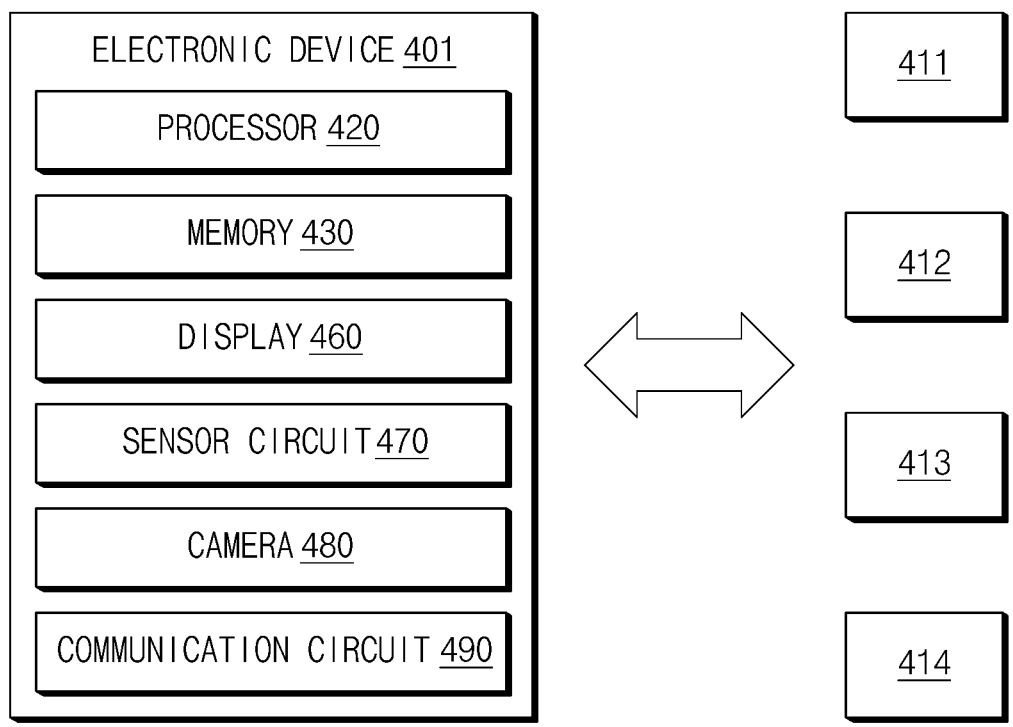
FIG. 4 is a block diagram illustrating an example configuration of an electronic device according to various embodiments.

FIG. 4 is a block diagram illustrating an example configuration of an example electronic device according to various embodiments.

For example, an electronic device 401 (e.g., the electronic device 101 of FIG. 1 or the electronic device 201 of FIG. 2) may include a processor (e.g., including processing circuitry) 420 (e.g., the processor 120 of FIG. 1), a memory 430 (e.g., the memory 130 of FIG. 1), a display 460 (e.g., the display module 160 of FIG. 1), a sensor circuit 470 (e.g., the sensor module 176 of FIG. 1), a camera 480 (e.g., the camera module 180 of FIG. 1), and/or a communication circuit 490 (e.g., the communication module 190 of FIG. 1). The processor 420 may be operatively connected to other components of the electronic device 401 and may include various processing circuitry and control various operations of the electronic device 401. The processor 420 may perform various operations of the electronic device 401 by executing one or more instructions stored in the memory 430. Hereinafter, operations described as being performed by the electronic device 401 may be referred to as being performed by the processor 420. The memory 430 may be operatively connected to at least the processor 420 and may store instructions. The memory 430 may store various types of information. For example, the memory 430 may store information (e.g., an external electronic device profile) on at least one external electronic device. The information on the external electronic device may include an image of an external electronic device (e.g., a color image, black and white image, two-dimensional image, and/or three-dimensional image), identification information of the external electronic device (e.g., a name, model name, serial number, universally unique identifier (UUID), and/or ID of the external electronic device), capabilities of the external electronic device (e.g., supported communication protocols, supported services, and/or supported profiles), application information of the external electronic device (e.g., application information installed in the external electronic device and/or application information running in the external electronic device), and/or address information of the external electronic device (e.g., a Bluetooth address, a medium access control (MAC) address, and/or a uniform resource locator URL)).

The electronic device 401 may include the display 460. The display 460 may provide an AR environment to the user. The display 460 may include a transparent or translucent display area. For example, the display 460 may include a transparent display. The user may view an image of an external environment through the display area. For example, the display 460 may be a transparent display positioned closely in front of the user's eyeball. For another example, the display 460 may be configured to project an image onto a transparent display area positioned closely in front of the user's eyeball. The description of the structure of the display 460 may be referred to by the structure of the display described above with reference to FIGS. 2 and 3.

The electronic device 401 may include the sensor circuit 470. For example, the sensor circuit 470 may include at least one sensor. The sensor circuit 470 may include the eye-tracking sensor described above with reference to FIG. 2. The sensor circuit 470 may include an inertial sensor (e.g., a gyro sensor and/or an accelerometer). The sensor circuit 470 may include the eye-tracking sensor and/or the inertial sensor. The sensor circuit 470 may include, for example, a sensor for measuring a distance between an external electronic device and the electronic device 401.

The electronic device 401 may include the camera 480. The camera 480 may include at least one camera. The camera 480 may be configured to acquire an image (e.g., a two-dimensional and/or three-dimensional image) in the direction corresponding to the gaze of the user when the electronic device 401 is worn by the user.

The communication circuit 490 may support communication based on at least one communication protocol. For example, the communication circuit 490 may support short-range wireless communication (e.g., NFC, Bluetooth (e.g., Bluetooth™ legacy and/or Bluetooth™ low energy), WiFi, ultra-wideband (UWB) communication, and/or neighbor awareness networking (NAN) communication. For example, the communication circuit 490 may support long-range wireless communication (e.g., a cellular network and/or a wide area network (WAN)). The communication circuit may include at least one antenna, at least one amplifier, at least one filter, at least one phase shifter, at least one switch, and/or at least one communication module for supporting at least one communication protocol.

In the present disclosure, a field of view (FOV) may refer, for example, to a range in which a user may see without moving their eyes when gazing at a certain point. In addition, when a person sees an object, they can clearly see what is in the direction of their gaze, and may perceive, even if it is not perfect, the existence of what is around the gaze direction. In this case, the former may be referred to as a central field of view and the latter may be referred to as a peripheral field of view. In the present disclosure, the field of view may include the central field of view and/or the peripheral field of view. In the present disclosure, the field of view of the camera may be referred to as at least a portion of an image acquired by an image sensor of the camera through the lens of the camera. Hereinafter, an image corresponding to the field of view of the user may be referred to as an image having a range similar to that of an image included in the field of view of the user.

The processor 420 may include various processing circuitry and communicate with an external electronic device (e.g., the first to fourth external electronic devices 411, 412, 413, and 414) using the communication circuit 490. For example, the processor 420 may register an external electronic device based on a protocol specified using the communication circuit 490. If the Bluetooth protocol is used, the processor 420 may register an external electronic device with the electronic device 401 during pairing with the external electronic device. The processor 420 may store information on the external electronic device (e.g., the image of the external electronic device, identification information of the external electronic device, capabilities of the external electronic device, application information of the external electronic device, and/or address information of the external electronic device) in the memory 430 through registration of the external electronic device.

The processor 420 may detect the gaze or the gaze direction of the user of the electronic device 401. For example, the processor 420 may detect the gaze or gaze direction of the user using the sensor circuit 470. The processor 420 may detect the gaze of the user using the eye-tracking sensor of the sensor circuit 470. The processor 420 may detect a direction in which the user's head is facing using the inertial sensor of the sensor circuit 470 and detect the detected direction as the gaze direction.

The processor 420 may identify an external electronic device corresponding to the gaze of the user or the gaze direction of the user. For example, the processor 420 may detect the gaze or gaze direction of the user using the sensor circuit 470, and identify an external electronic device positioned in the gaze or the gaze direction. For another example, the processor 420 may identify an external electronic device corresponding to the gaze of the user or the gaze direction of the user using the camera 480. The processor 420 may acquire an image corresponding to the user's field of view using the camera 480, and may identify an external electronic device corresponding to the gaze of the user or the gaze direction of the user from the acquired image. The processor 420 may identify an external electronic device positioned in the center of the image or an external electronic device occupying the largest area in the image as an external electronic device corresponding to the gaze of the user or the gaze direction of the user. Hereinafter, the external electronic device corresponding to the gaze of the user or the gaze direction of the user may be referred to as a gaze-corresponding external electronic device.

The processor 420 may identify an image of the external electronic device using the camera 480. For example, the processor 420 may acquire a 2D or 3D image using the camera 480, and identify an image of the external electronic device or the external electronic device by comparing the acquired image with information on the external electronic device stored in the memory 430. For example, the processor 420 may acquire information on the gaze-corresponding external electronic device from the memory 430.

The processor 420 may display information on the gaze-corresponding external electronic device using the display 460. The processor 420 may display the information on the gaze-corresponding external electronic device in the AR environment by displaying a virtual object using the display 460. For example, the processor 420 may provide visual feedback on the external electronic device corresponding to the gaze by displaying the virtual object at the position of the gaze-corresponding external electronic device. For example, the processor 420 may provide information on the external electronic device (e.g., identification information of the external electronic device and/or application information of the external electronic device) by displaying the virtual object.

According to an embodiment, the processor 420 may connect to at least one external electronic device based on the gaze of the user. For example, the processor 420 may identify the gaze-corresponding external electronic device and connect to the external electronic device based on application information of the gaze-corresponding external electronic device. If an application for media output is running in the gaze-corresponding external electronic device, the processor 420 may connect to the gaze-corresponding external electronic device and output the content of the electronic device 401 through the connected gaze-corresponding external electronic device. For example, the processor 420 may provide an image of the electronic device 401 through the display of the external electronic device.

The processor 420 may provide audio data of the electronic device 401 through an audio output device of an external electronic device. If an application for input reception (e.g., a driver) is running in the gaze-corresponding external electronic device, the processor 420 may connect to the gaze-corresponding external electronic device and receive an input to the electronic device 401 through the connected gaze-corresponding external electronic device. For example, the processor 420 may receive an input through the external electronic device and control an application running in the electronic device 401 based on the received input.

According to an embodiment, the processor 420 may switch the connection of at least one external electronic device based on the gaze of the user. For example, the processor 420 may be outputting media through the first external electronic device 411. During media output through the first external electronic device 411, the processor 420 may detect a gaze of the user to the second external electronic device 412. The processor 420 may check whether the second external electronic device 412 is running an application for outputting media based on the gaze of the user. If the second external electronic device 412 is running the application for outputting media, the processor 420 may connect to the second external electronic device 412 using the communication circuit 490. The processor 420 may output media through the second external electronic device 412 through the connection. The media output may be switched from the first external electronic device 411 to the second external electronic device 412.

Hereinafter, various operations of the electronic device 401 will be described in greater detail below with reference to FIGS. 5 to 18. Various operations of the electronic device 401 described below may be combined with the operations of the electronic device 401 described above with reference to FIG. 4. The components of the electronic device 401 illustrated in FIG. 4 are non-limiting examples, and examples of the present disclosure are not limited thereto. For example, the electronic device 401 may further include a component not illustrated in FIG. 4. As described above with reference to FIG. 2, the electronic device 401 may be referred to as the HMD device or the AR glasses device.

According to an embodiment, the processor 420 may be configured to acquire an image including an image of at least one external electronic device using the camera 480, acquire running application information of the at least one external electronic device using the communication circuit 490, identify the first external electronic device 411 corresponding to a gaze of a user from among the at least one external electronic device from the acquired image, determine whether a specified application is running in the first external electronic device 411 based on the running application information, and connect to the first external electronic device 411 using the communication circuit 490, when the specified application is running. For example, the processor 420 may be configured to identify the first external electronic device 411 corresponding to the gaze of the user from among the at least one external electronic device based on a center of the acquired image or an image size of the first external electronic device in the acquired image. For example, the processor 420 may be configured to output content of the electronic device 401 using the first external electronic device 411, after the connection to the first external electronic device 411.

For example, the electronic device 401 may further include an eye-tracking sensor, and the processor 420 may be configured to identify the first external electronic device 411 corresponding to the gaze of the user using the eye-tracking sensor.

For example, the processor 420 may be configured to identify the first external electronic device 411 by comparing the acquired image with the images in the memory 430.

According to an embodiment, the processor 420 may be configured to display running application information associated with the first external electronic device 411 using the display 460.

For example, the processor 420 may be configured to connect to the first external electronic device 411 based on a user input for selecting the first external electronic device 411. For example, the user input may include at least one of an input for a button, an input for a controller connected to the electronic device 401, a voice input, or a gesture input.

According to an embodiment, the processor 420 may output the content through the second external electronic device 412 before the connection to the first external electronic device 411. The processor 420 may be configured to connect to the first external electronic device 411 based on the gaze of the user during the output of the content through the second external electronic device 412. For example, the specified application may include an application supporting output of the content. The content may include audio content. The processor 420 may provide a preview of the audio content by playing the audio content through the first external electronic device 411, if connected to the first external electronic device 411. The processor 420 may be configured to release the connection to the second external electronic device 412 if the gaze of the user to the first external electronic device 411 is maintained for a specified time or longer after the connection to the first external electronic device 411.

Figure 5:
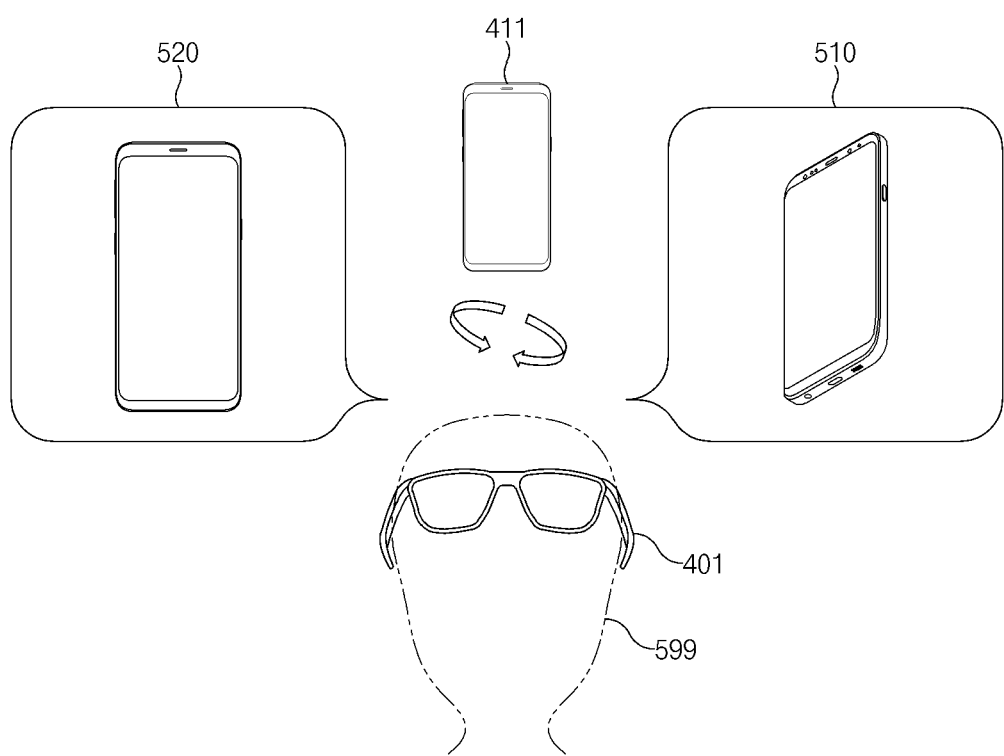
FIG. 5 is a diagram illustrating an example registration of external electronic device information of an electronic device according to various embodiments.

FIG. 5 is a diagram illustrating example registration of external electronic device information of an electronic device according to various embodiments.

Referring to FIG. 5, the electronic device 401 may be assumed to be worn by a user 599. The electronic device 401 may register the first external electronic device 411 using the communication circuit 490. For example, the electronic device 401 may register the first external electronic device 411 with the electronic device 401 upon initial connection (e.g., pairing) with the first external electronic device 411. The electronic device 401 may receive, from a nearby external electronic device (e.g., the first external electronic device 411), information on the nearby external electronic device (e.g., identification information, address information, capability information, and/or application information) using the communication circuit 490. The electronic device 401 may display, on the display 460, the received information on the nearby external electronic device. In an example, the electronic device 401 may connect to an external electronic device based on a user selection. The electronic device 401 may connect to the first external electronic device 411 selected based on a user input (e.g., an input for a physical button (e.g., a hardware button or a touch button) of the electronic device 401, a voice input of the user 599, or a gesture input of the user 599).

According to an embodiment, the electronic device 401 may store information on the appearance of the first external electronic device 411, together with the information on the first external electronic device 411, in the memory 430. The electronic device 401 may receive information on the first external electronic device 411 (e.g., identification information, address information, capability information, and/or application information) using the communication circuit 490. The electronic device 401 may store the received information on the first external electronic device 411 in the memory 430. The information on the appearance may include at least one of a 2D image 520 and a 3D image 510 of the first external electronic device 411. The electronic device 401 may map the information on the appearance of the first external electronic device 411 to the information on the first external electronic device 411 and store it in the memory 430.

In an example, the electronic device 401 may acquire the information on the appearance of the first external electronic device 411 using the camera 480 of the electronic device 401. The electronic device 401 may acquire the information on the appearance by acquiring the 2D image 520 of the first external electronic device 411 using the camera 480. For example, the electronic device 401 may provide a visual and/or audio guide for positioning the first external electronic device 411 within the field of view of the camera 480. The electronic device 401 may acquire the information on the appearance by acquiring the 3D image 510 of the first external electronic device 411 using the camera 480. For example, the camera 480 may be configured to acquire depth information. The electronic device 401 may provide a visual and/or audio guide for scanning a plurality of surfaces of the first external electronic device 411. The user 599 may acquire the 3D image 510 (e.g., 3D model data) of the first external electronic device 411 by moving (e.g., rotating and/or moving) the first external electronic device 411 according to the guide. The above-described 2D image 520 or 3D image 510 may include color data and/or shape data.

In an example, the electronic device 401 may acquire the information on the appearance of the first external electronic device 411 using the communication circuit 490. The electronic device 401 may transmit the acquired information on the first external electronic device 411 (e.g., identification information or model information) to an external server using the communication circuit 490. The electronic device 401 may receive, from the external server, a response including the information on the appearance corresponding to the first external electronic device 411. The electronic device 401 may acquire the information on the appearance of the first external electronic device 411 from the response received from the external server.

Figure 6:
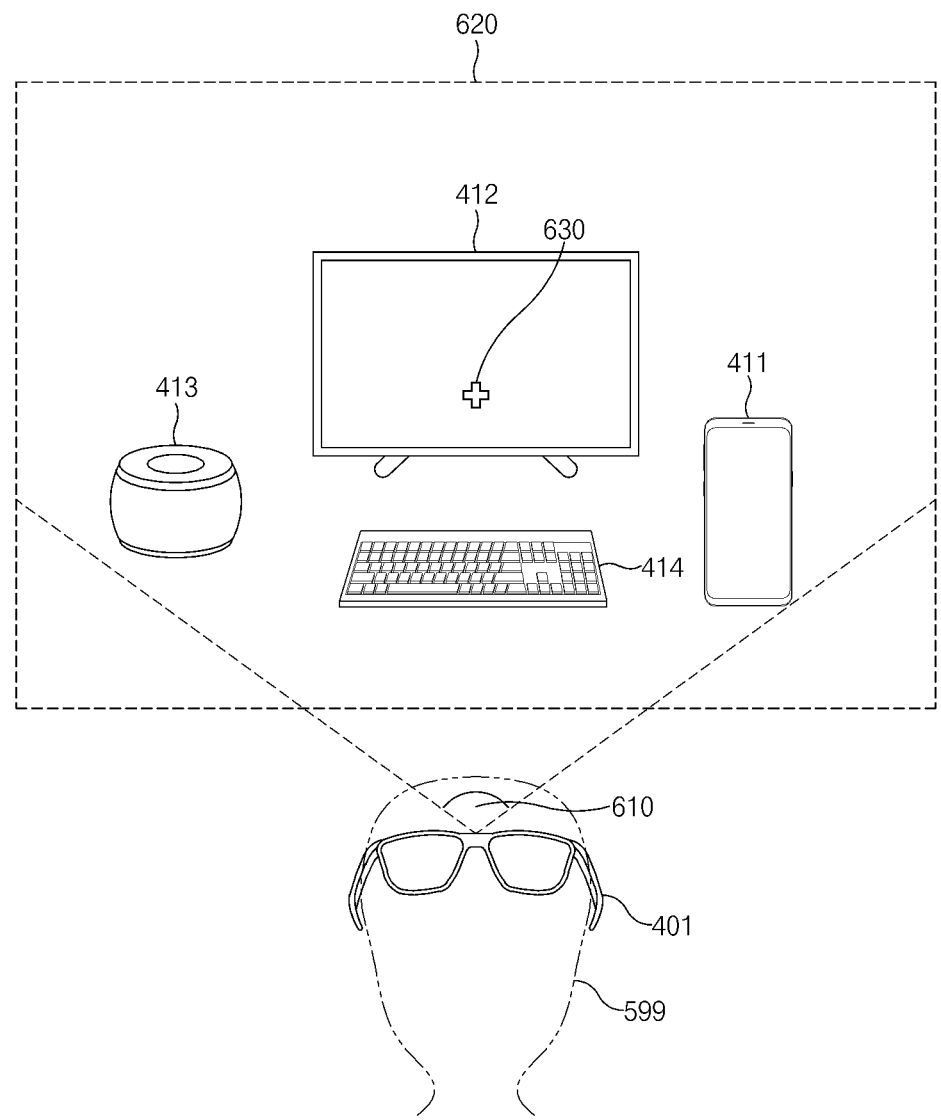
FIG. 6 is a diagram illustrating an example selection of an external electronic device according to various embodiments.
Figure 7:
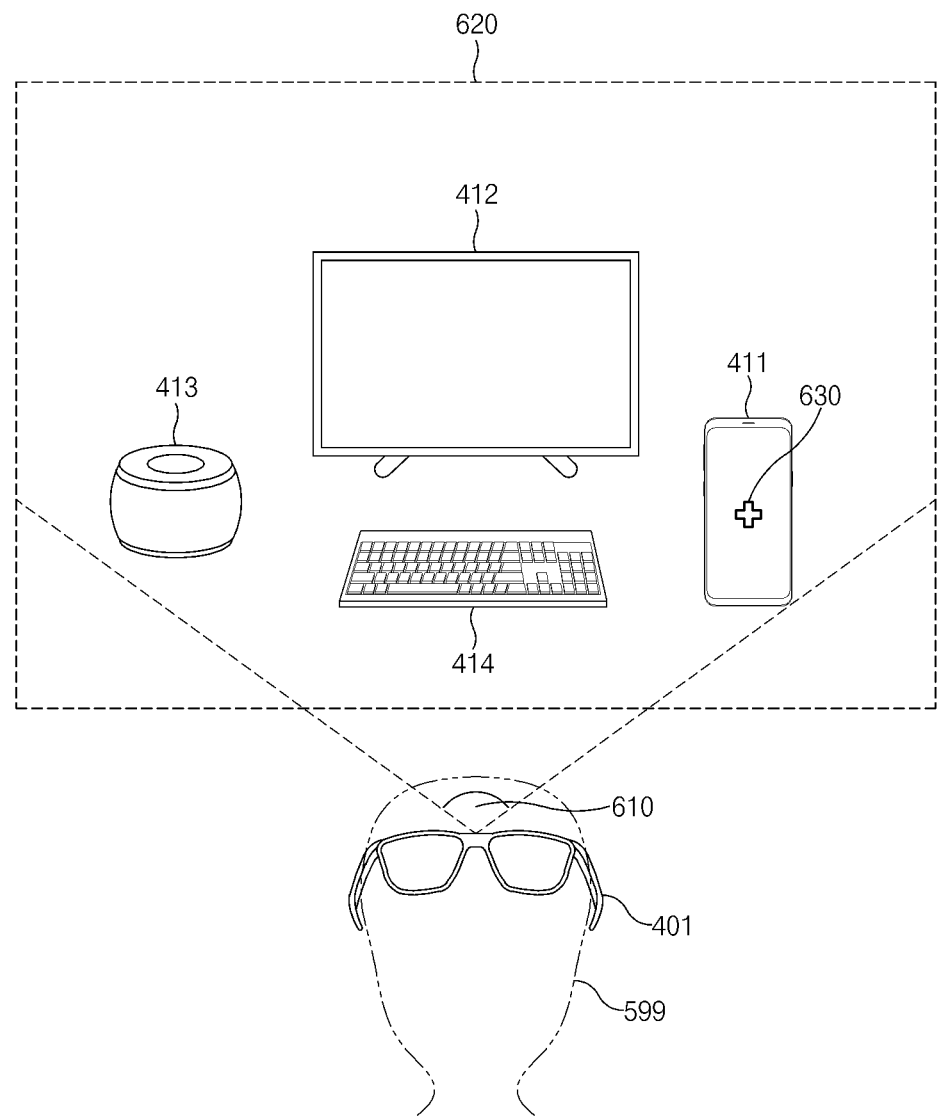
FIG. 7 is a diagram illustrating an example selection of an external electronic device according to various embodiments.

Hereinafter, an example method for selecting an external electronic device by the electronic device 401 may be described in greater detail with reference to FIGS. 6 and 7. In the examples of FIGS. 6 and 7, it may be assumed, for convenience and ease of description, that the electronic device 401 has completed the registration of the first external electronic device 411, the second external electronic device 412, the third external electronic device 413, and the fourth external electronic device 414.

FIG. 6 is a diagram illustrating an example selection of an external electronic device according to various embodiments.

Referring to FIG. 6, the first external electronic device 411, the second external electronic device 412, and the third external electronic device 413, and the fourth external electronic device 414 may be positioned within a field of view 620 (e.g., the field of view of the user 599 or the field of view of the camera 480). According to an embodiment, the electronic device 401 may identify a gaze-corresponding external electronic device using the camera 480. For example, the electronic device 401 may acquire an image corresponding to the field of view 620 using the camera 480, and may identify an electronic device positioned in the center of the image as the gaze-corresponding external electronic device. In the example of FIG. 6, the electronic device 401 may identify the second external electronic device 412 positioned in the center of the field of view 620 as the gaze-corresponding external electronic device. For another example, the electronic device 401 may acquire an image corresponding to the field of view 620 using the camera 480, and identify an external electronic device having the largest area in the image as the gaze-corresponding external electronic device. In the example of FIG. 6, the electronic device 401 may identify the second external electronic device 412 having the largest size in the field of view 620 as the gaze-corresponding external electronic device.

In an example, the electronic device 401 may display an object 630 at a point corresponding to the gaze of the user (e.g., the center of the field of view 620) using the display 460.

FIG. 7 is a diagram illustrating an example selection of an external electronic device according to various embodiments.

Referring to FIG. 7, the first external electronic device 411, the second external electronic device 412, and the third external electronic device 413, and the fourth external electronic device 414 may be positioned within a field of view 620 (e.g., the field of view of the user 599 or the field of view of the camera 480). According to an embodiment, the electronic device 401 may identify a gaze-corresponding external electronic device using the camera 480 and the sensor circuit 470. For example, the electronic device 401 may detect the gaze direction of the user 599 using the sensor circuit 470. The electronic device 401 may acquire an image corresponding to the field of view 620 using the camera 480, and may identify an electronic device positioned in the gaze direction of the user in the image as the gaze-corresponding external electronic device. In the example of FIG. 6, the electronic device 401 may identify the first external electronic device 411 positioned in the gaze direction as the gaze-corresponding external electronic device. The electronic device 401 may display an object 630 at a point corresponding to the gaze of the user using the display 460.

In the examples of FIGS. 6 and 7, the electronic device 401 may identify the gaze-corresponding external electronic device. For example, when the gaze or field of view 620 of the user is maintained for a specified time or longer, the electronic device 401 may identify a gaze-corresponding external electronic device. In order to prevent and/or reduce a likelihood that the gaze-corresponding external electronic device that does not conform to the user's intention from being identified, the electronic device 401 may identify the gaze-corresponding external electronic device based on the gaze or the field of view 620 maintained for the specified time.

According to an embodiment, the electronic device 401 may connect to a gaze-corresponding external electronic device. The electronic device 401 may receive, from the first to fourth external electronic devices 411, 412, 413, and 414, external electronic device information (e.g., identification information, capability information, application information, and/or address information), using the communication circuit 490. The electronic device 401 may determine whether to connect to the gaze-corresponding external electronic device based on the external electronic device information. If the gaze-corresponding external electronic device is in an inactive state (e.g., a power OFF state or a sleep state), the electronic device 401 may not connect to the gaze-corresponding external electronic device. If the gaze-corresponding external electronic device is in an active state (e.g., a power ON state or a wake-up state), the electronic device 401 may determine whether to connect to the gaze-corresponding external electronic device based on application information of the gaze-corresponding external electronic device. For example, if an application capable of performing a service in conjunction with the electronic device 401 is running in the gaze-corresponding external electronic device, the electronic device 401 may connect to the gaze-corresponding external electronic device and provide the service through the gaze-corresponding external electronic device. For another example, if an application capable of performing a service in conjunction with the electronic device 401 is installed in the gaze-corresponding external electronic device but is not running, the electronic device 401 may connect to the gaze-corresponding external electronic device and may request the gaze-corresponding external electronic device to run the application for providing the service. If the application runs in the gaze-corresponding external electronic device, the electronic device 401 may provide the service through the gaze-corresponding external electronic device.

According to an embodiment, the electronic device 401 may display information on the gaze-corresponding external electronic device. The electronic device 401 may display the information on the gaze-corresponding external electronic device using the information on the external electronic device acquired using the communication circuit 490. For example, the electronic device 401 may display information on a service (e.g., an application) being executed in the gaze-corresponding external electronic device and information on a service not being executed, differently. Hereinafter, a method for displaying gaze-corresponding external electronic device information of an electronic device may be described with reference to FIGS. 8 to 11.

Figure 8:
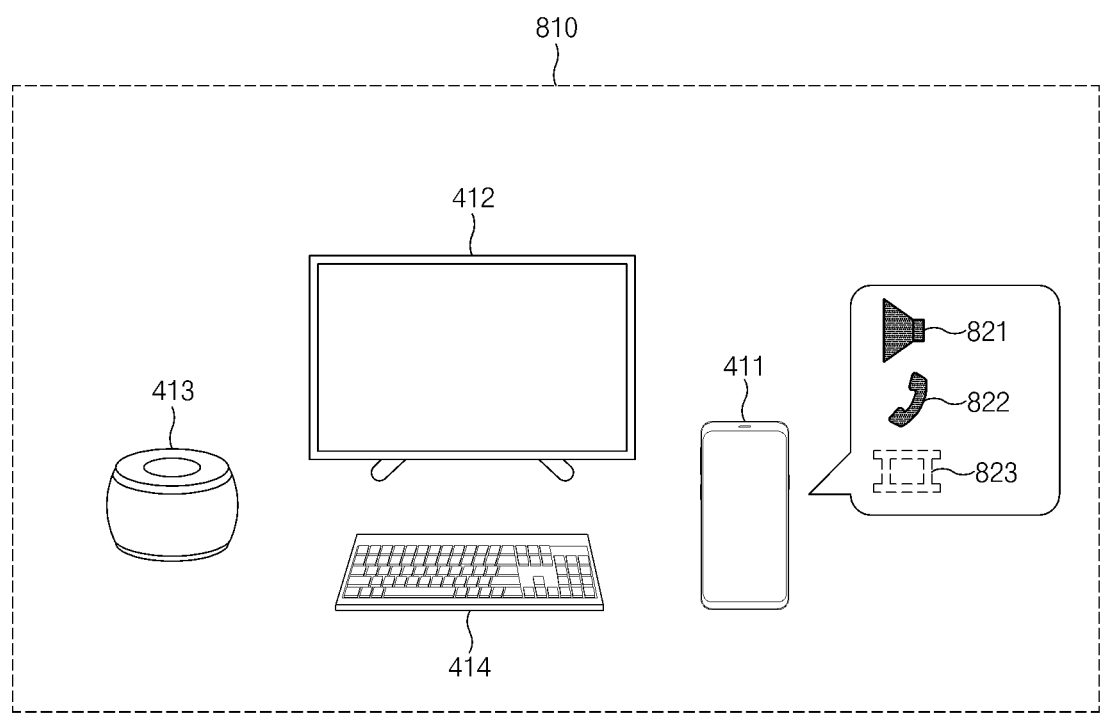
FIG. 8 is a diagram illustrating an example display of first external electronic device information according to various embodiments.

FIG. 8 is a diagram illustrating an example display of first external electronic device information according to various embodiments.

Referring to FIG. 8, the electronic device 401 may display information on the first external electronic device 411 within a field of view 810. For example, the electronic device 401 may display information on the first external electronic device 411 at a position adjacent to the first external electronic device 411 in the display area. In the example of FIG. 8, in the first external electronic device 411, an audio output application, a phone application, and a video playback application that provide a service in conjunction with the electronic device 401 may be installed. The electronic device 401 may display an audio output application icon 821, a phone application icon 822, and a video playback application icon 823 based on the application information received from the first external electronic device 411.

In the example of FIG. 8, the audio output application and the phone application may be running in the first external electronic device 411, and the video playback application may not be running. The electronic device 401 may display the icons of the audio output application and the phone application that are running in a first state, and display the icon of the video playback application that is not running in a second state that is different from the first state. For example, the electronic device 401 may display the icons in the second state by dimming the icons. The electronic device 401 may display the icons in the first state by not dimming the icons.

Figure 9:
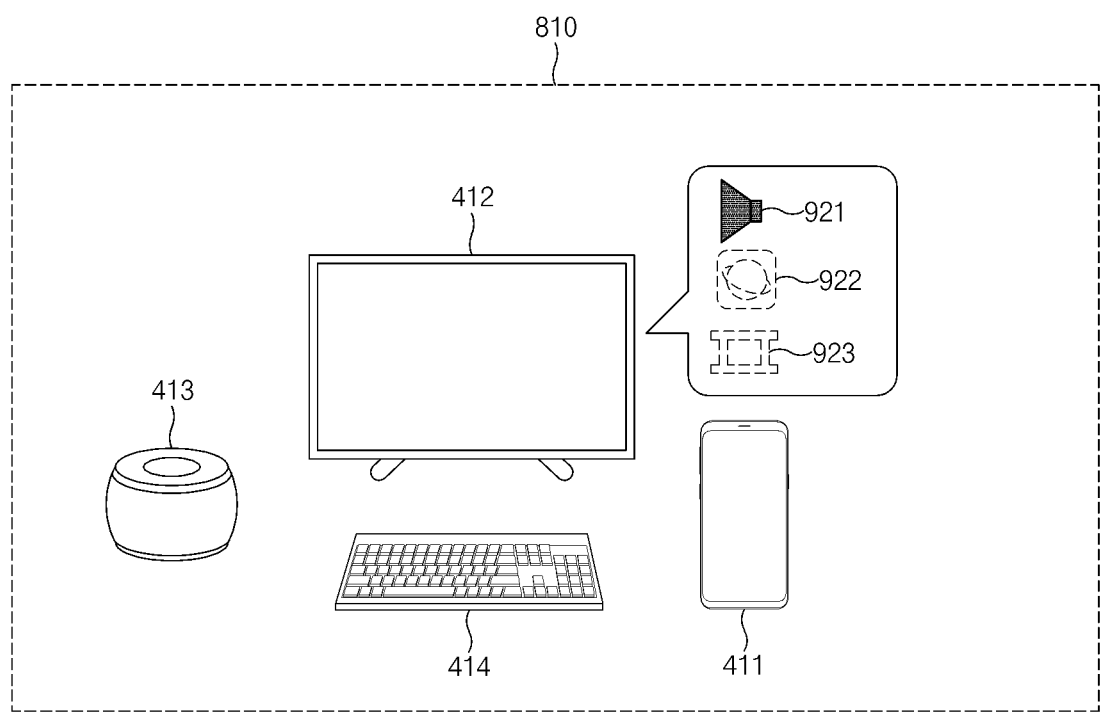
FIG. 9 is a diagram illustrating an example display of second external electronic device information according to various embodiments.

FIG. 9 is a diagram illustrating an example display of second external electronic device information according to various embodiments.

Referring to FIG. 9, the electronic device 401 may display information on the second external electronic device 412 within the field of view 810. For example, the electronic device 401 may display information on the second external electronic device 412 at a position adjacent to the second external electronic device 412 in the display area. In the example of FIG. 9, in the second external electronic device 412, an audio output application, an Internet application, and a video playback application that provide a service in conjunction with the electronic device 401 may be installed. The electronic device 401 may display an audio output application icon 921, an Internet application icon 922, and a video playback application icon 923 based on the application information received from the second external electronic device 412.

According to an embodiment, the electronic device 401 may provide a service through the first external electronic device 411 based on a user input. For example, the electronic device 401 may receive a user input for selecting an audio output application. The electronic device 401 may receive a user input based on a voice input of the user, an input for a button of the electronic device 401, or an input based on the gaze of the user (e.g., the gaze of the user to a specific application maintained for a specified time or longer). In response to receiving the user input, the electronic device 401 may control the first external electronic device 411 to output audio content of the electronic device 401 through the first external electronic device 411.

In the example of FIG. 9, the audio output application may be running in the second external electronic device 412, and the Internet application and the video playback application may not be running. The electronic device 401 may display the icon of the audio output application that is running in the first state, and display the icons of the Internet application and the video playback application that are not running in the second state.

According to an embodiment, the electronic device 401 may provide a service through the second external electronic device 412 based on a user input. For example, the electronic device 401 may be outputting audio content through the second external electronic device 412. The electronic device 401 may receive a user input for selecting the audio output application of the second external electronic device 412. In response to receiving the user input, the electronic device 401 may control the second external electronic device 412 to output the audio content through the second external electronic device 412, instead of the first external electronic device 411.

Figure 10:
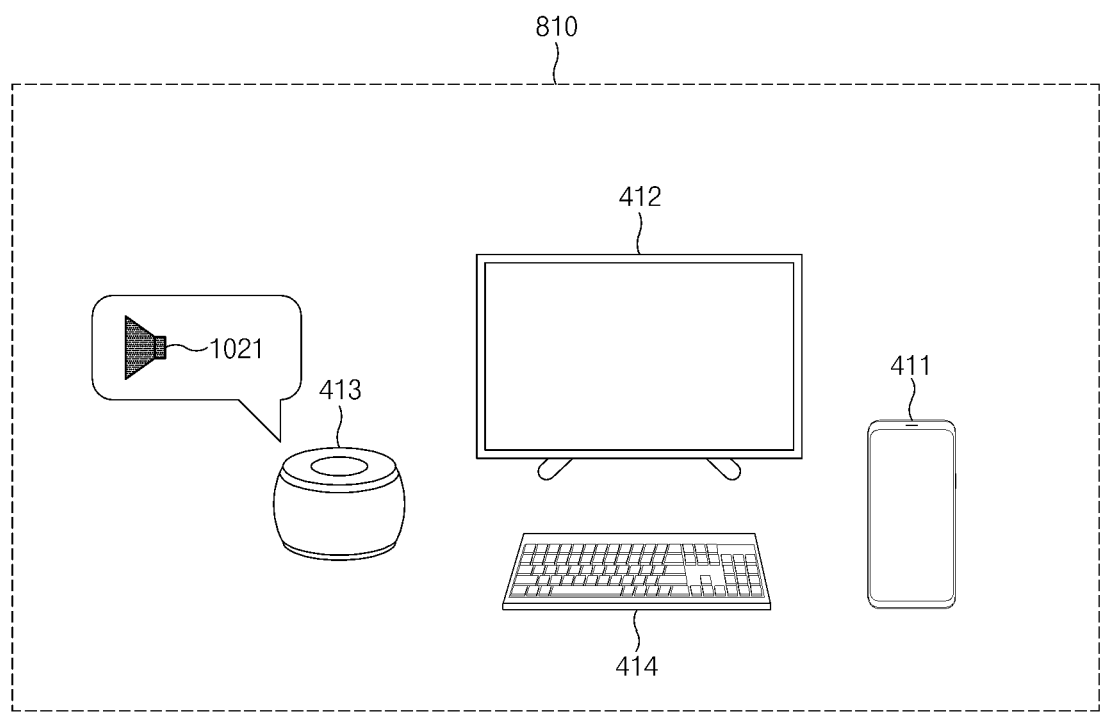
FIG. 10 is a diagram illustrating an example display of third external electronic device information according to various embodiments.

FIG. 10 is a diagram illustrating an example display of third external electronic device information according to various embodiments.

Referring to FIG. 10, the electronic device 401 may display information on the third external electronic device 413 within the field of view 810. For example, the electronic device 401 may display information on the third external electronic device 413 at a position adjacent to the third external electronic device 413 in the display area. In the example of FIG. 10, in the third external electronic device 413, an audio output application that provides a service in conjunction with the electronic device 401 may be installed. The electronic device 401 may display an audio output application icon 1021 based on the application information received from the third external electronic device 413. The audio output application may be running in the third external electronic device 413. The electronic device 401 may display the icon of the audio output application that is running in the first state.

According to an embodiment, the electronic device 401 may provide a service through the third external electronic device 413 based on a user input. For example, the electronic device 401 may be outputting audio content through the second external electronic device 412. During the output of the audio content, the electronic device 401 may receive a user input for selecting the audio output application of the third external electronic device 413. In response to receiving the user input, the electronic device 401 may control the third external electronic device 413 to output the audio content through the third external electronic device 413, instead of the second external electronic device 412.

Figure 11:
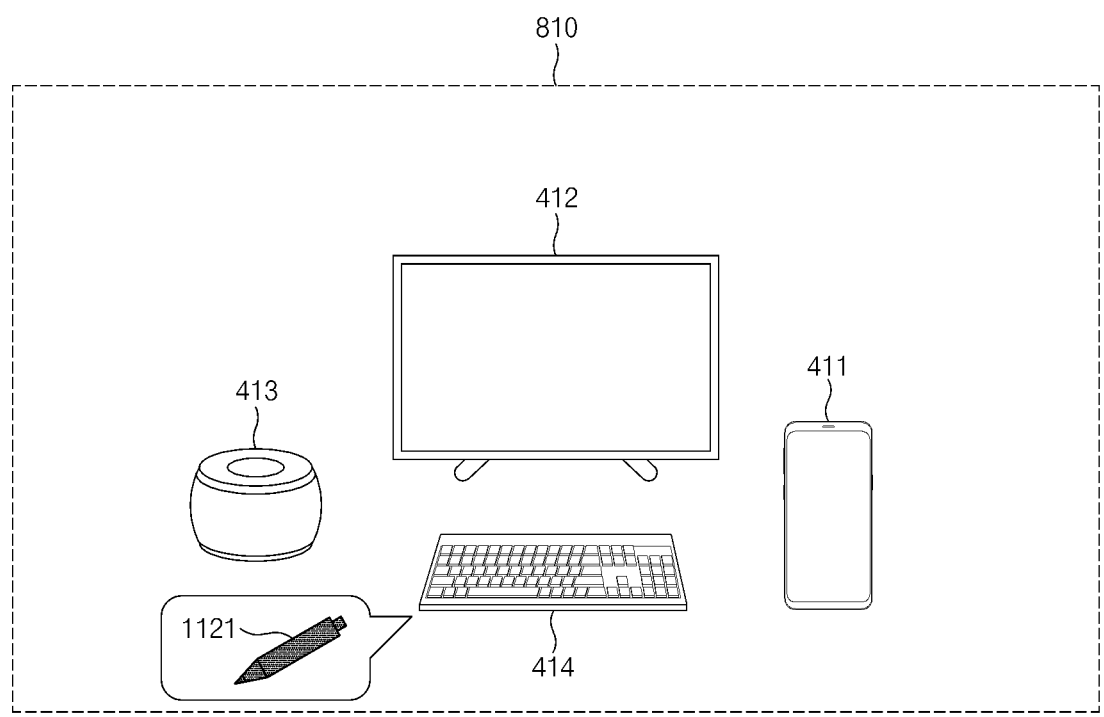
FIG. 11 is a diagram illustrating an example display of fourth external electronic device information according to various embodiments.

FIG. 11 is a diagram illustrating an example display of fourth external electronic device information according to various embodiments.

Referring to FIG. 11, the electronic device 401 may display information on the fourth external electronic device 414 within the field of view 810. For example, the electronic device 401 may display information on the fourth external electronic device 414 at a position adjacent to the fourth external electronic device 414 in the display area. In the example of FIG. 11, in the fourth external electronic device 414, an input application that provides a service in conjunction with the electronic device 401 may be installed. The electronic device 401 may display an input application icon 1121 based on the application information received from the fourth external electronic device 414.

According to an embodiment, the electronic device 401 may provide a service through the fourth external electronic device 414 based on a user input. For example, the electronic device 401 may be outputting audio content through the third external electronic device 413. During the output of the audio content, the electronic device 401 may receive a user input for selecting the input application of the fourth external electronic device 414. In response to receiving the user input, the electronic device 401 may connect to the fourth external electronic device 414 and receive the user input through the fourth external electronic device 414. In this case, the electronic device 401 may maintain the audio output through the third external electronic device 413. For example, a profile (e.g., advanced audio distribution profile) related to the connection to the third external electronic device 413 and a profile (e.g., human interface device profile) related to the connection to the fourth external electronic device 414 may be different from each other.

Figure 12:
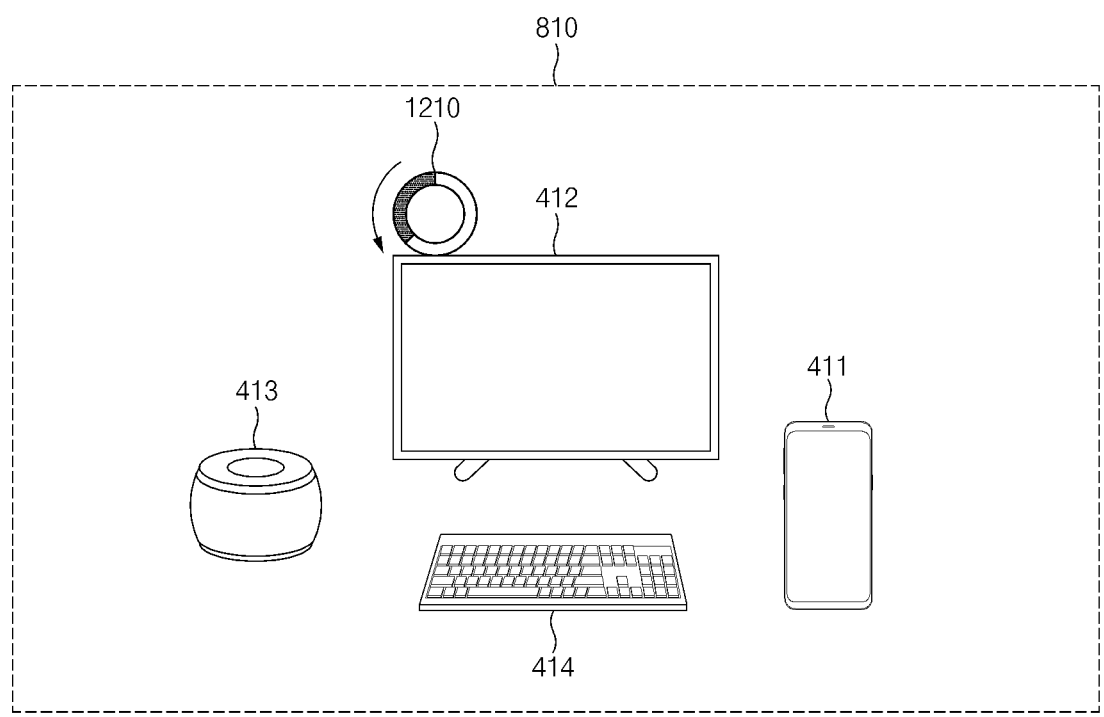
FIG. 12 is a diagram illustrating an example connection indicator according to various embodiments.

FIG. 12 is a diagram illustrating an example connection indicator according to various embodiments.

Various examples in which the electronic device 401 connects to an external electronic device based on the user inputs have been described above with reference to FIGS. 8 to 11. However, embodiments of the present disclosure are not limited thereto. For example, the electronic device 401 may change the external electronic device outputting content even if the user does not explicitly select an application or service.

According to an embodiment, the electronic device 401 may change the device outputting content based on the gaze of the user to the external electronic device that supports the output of content that is being currently output. For example, the electronic device 401 may be outputting audio content through the first external electronic device 411. The electronic device 401 may identify the second external electronic device 412 as the gaze-corresponding external electronic device while outputting the audio content. If the second external electronic device 412 currently supports the output of the audio content output through the first external electronic device 411 (e.g., if the audio content output application is running), the electronic device 401 may output the audio content through the second external electronic device 412. For example, if the gaze of the user to the second external electronic device 412 is maintained for a specified time or longer, the electronic device 401 may output the audio content through the second external electronic device 412.

In an example, the electronic device 401 may display an indicator 1210 based on the gaze to a connectable external electronic device. For example, the indicator 1210 may indicate the passage of time while the gaze of the user to the second external electronic device 412 is maintained. If the time of the indicator 1210 expires, the electronic device 401 may connect to the second external electronic device 412.

In an embodiment, the electronic device 401 may provide a preview of the content using the second external electronic device 412. For example, while the indicator 1210 is being displayed, the electronic device 401 may play the preview of the content using the second external electronic device 412. In the electronic device 401, audio (hereinafter, first audio content) may be being played. While the indicator 1210 is being displayed, the electronic device 401 may provide the user with a preview by playing the first audio content through the second external electronic device 412. The preview operation of the electronic device 401 may be described in detail with reference to FIG. 17.

Figure 13:
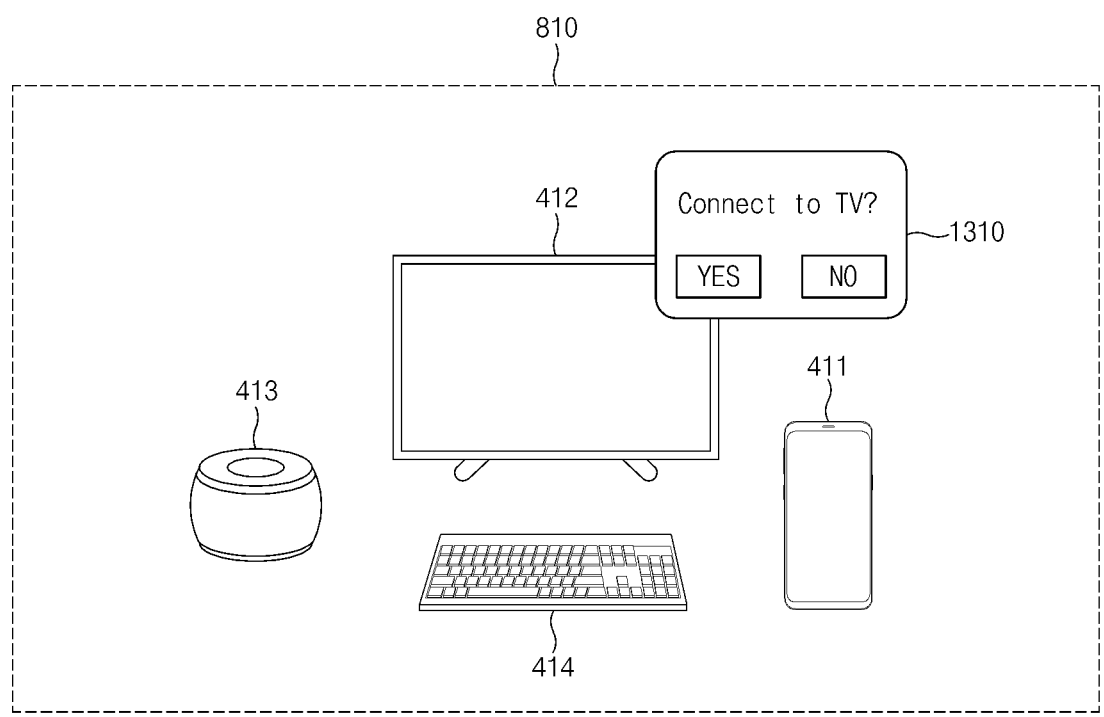
FIG. 13 is a diagram illustrating an example connection selection UI according to various embodiments.

FIG. 13 is a diagram illustrating example connection selection UI according to various embodiments.

According to an embodiment, the electronic device 401 may change the device outputting content based on the gaze of the user to the external electronic device that supports the output of content that is being currently output. For example, the electronic device 401 may be outputting audio content through the first external electronic device 411. The electronic device 401 may identify the second external electronic device 412 as the gaze-corresponding external electronic device while outputting the audio content. If the second external electronic device 412 currently supports the output of the audio content output through the first external electronic device 411 (e.g., if the audio content output application is running), the electronic device 401 may output the audio content through the second external electronic device 412. For example, if the gaze of the user to the second external electronic device 412 is maintained for a specified time or longer, the electronic device 401 may provide a pop-up image 1310 for inquiring about the provision of content through the second external electronic device 412. For example, based on a user input for the pop-up image 1310, the electronic device 401 may connect to the second external electronic device 412.

With reference to FIGS. 12 and 13, examples of connection switching user interfaces according to an embodiment of the present disclosure have been described. The examples of FIGS. 12 and 13 are for illustrative purposes, and embodiments of the present disclosure are not limited thereto. For example, the electronic device 401 may connect to an external electronic device based on the gaze of the user and a separate user input. If the gaze of the user corresponds to the second external electronic device 412 and an input is received through a physical button of the electronic device 401 or a controller connected to the electronic device 401, the electronic device 401 may connect to the second external electronic device 412.

Figure 14:
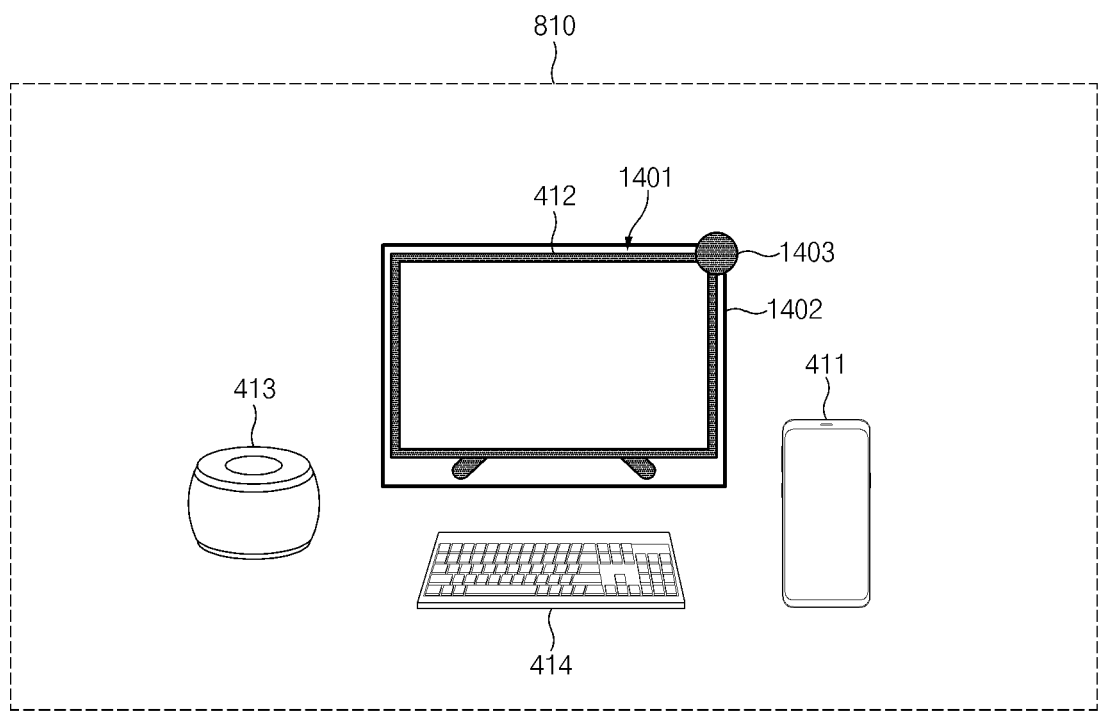
FIG. 14 is a diagram illustrating an example connection device indicator according to various embodiments.

FIG. 14 is a diagram illustrating an example connection device indicator according to various embodiments.

According to an embodiment, the electronic device 401 may provide a visual feedback on an external electronic device currently connected to the electronic device 401. The electronic device 401 may display at least one of a superimposed image 1401, an outline 1402, or an icon 1403 for the currently connected external electronic device. In the example of FIG. 14, it may be assumed that the electronic device 401 is connected to the second external electronic device 412. For example, the electronic device 401 may display a superimposed image 1401 on the second external electronic device 412. The user of the electronic device 401 may recognize the image of the second external electronic device 412 as a different color from the original image, through the superimposed image 1401. For example, the electronic device 401 may display an outline 1402 on the second external electronic device 412. For example, the electronic device 401 may display an icon 1403 adjacent to the second external electronic device 412.

Figure 15:
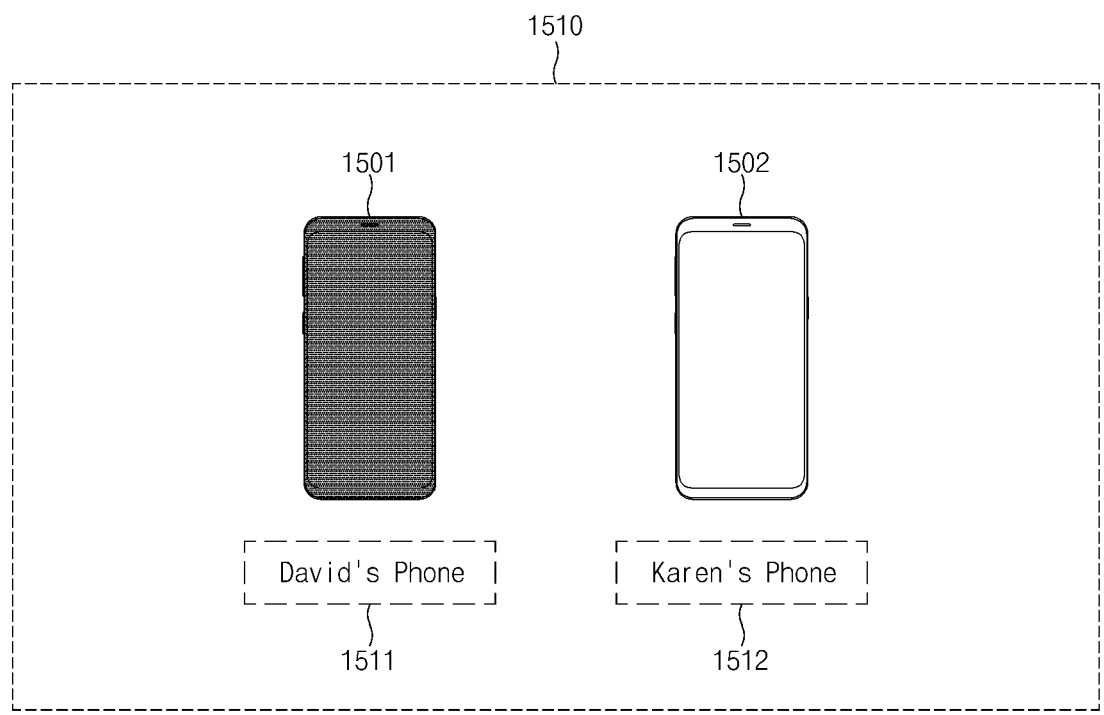
FIG. 15 is a diagram illustrating an example display of external electronic device information according to various embodiments.

FIG. 15 is a diagram illustrating an example display of external electronic device information according to various embodiments.

According to an embodiment, the electronic device 401 may display information for classifying a plurality of external electronic devices. If a plurality of electronic devices having the same appearance exist within a field of view of the electronic device 401, the user may identify the plurality of external electronic devices based on information on the plurality of external electronic devices.

Referring to FIG. 15, it may be assumed that the first external electronic device 1501 and the second external electronic device 1502 are of the same model. The electronic device 401 may display first identification information 1511 (e.g., the name and/or identifier of the first external electronic device 1501) of the first external electronic device 1501 at a position corresponding to the first external electronic device 1501. The electronic device 401 may display second identification information 1512 of the second external electronic device 1502 at a position corresponding to the second external electronic device 1502.

According to an embodiment, the electronic device 401 may identify a distance between an external electronic device and the electronic device 401. For example, the electronic device 401 may identify the distance using the communication circuit 490. The electronic device 401 may perform ranging with an external electronic device and identify the distance based on the ranging. For example, the electronic device 401 may identify the distance using the sensor circuit 470. The electronic device 401 may identify a distance to an external electronic device using a sensor for distance identification of the sensor circuit 470. For example, the electronic device 401 may identify the distance using the camera 480. The electronic device 401 may acquire depth information using the camera 480 and identify a distance to the external electronic device based on the depth information.

According to an embodiment, the electronic device 401 may display information on an external electronic device based on the distance to the external electronic device. For example, the electronic device 401 may display information on the external electronic device in a larger size as the distance to the external electronic device is closer. The electronic device 401 may display first identification information 1511 based on the distance to the first external electronic device 1501 and display the second identification information 1512 based on the distance to the second external electronic device 1502.

Figure 16:
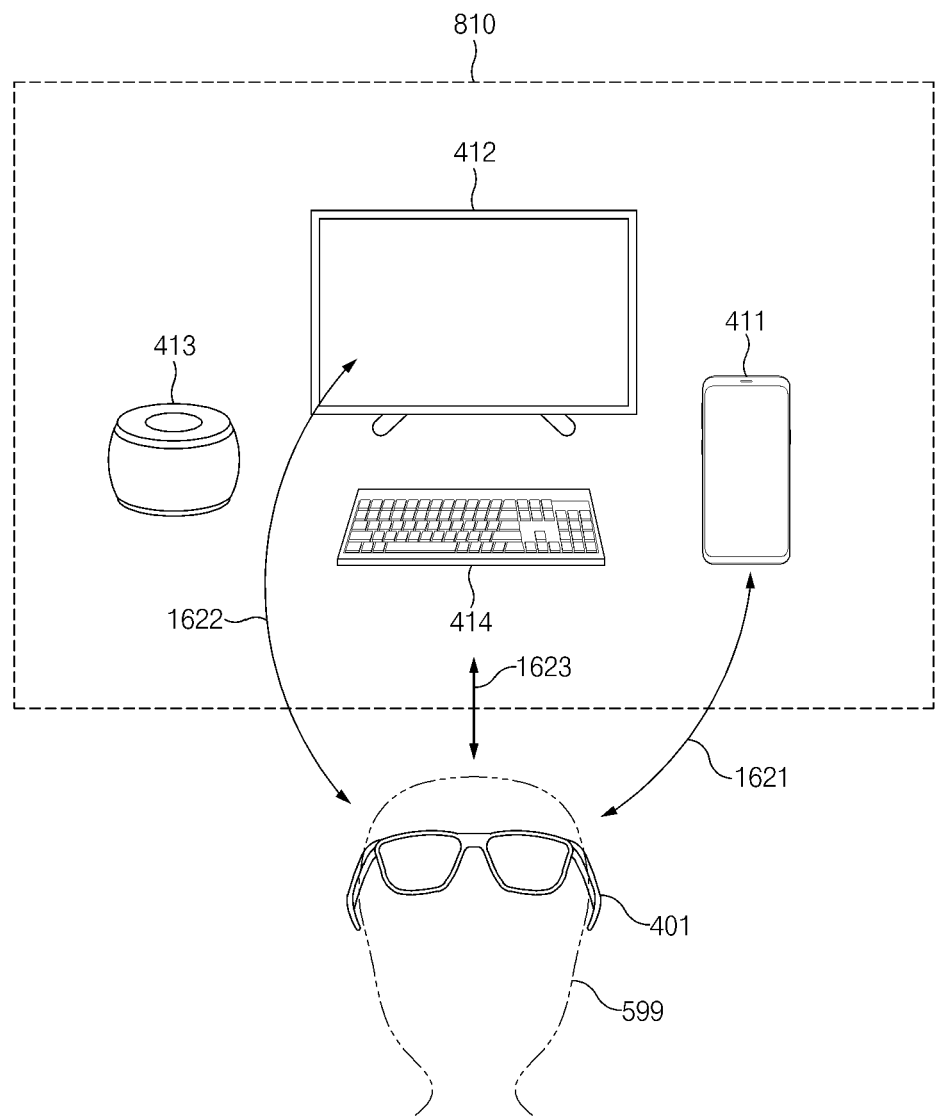
FIG. 16 is a diagram illustrating example connections of multiple devices according to various embodiments.

FIG. 16 is a diagram illustrating example connections of multiple devices according to various embodiments.

According to an embodiment, the electronic device 401 may be simultaneously or substantially simultaneously connected to a plurality of external electronic devices. For example, the electronic device 401 may be connected to the first external electronic device 411, the second external electronic device 412, and the fourth external electronic device 414.

If the electronic device 401 is connected to a plurality of external electronic devices, the electronic device 401 may provide different services using each of the plurality of external electronic devices. For example, the electronic device 401 may be connected to the first external electronic device 411 through a first connection 1621. The electronic device 401 may provide a phone service through the first external electronic device 411. The electronic device 401 may be connected to the second external electronic device 412 through a second connection 1622. The electronic device 401 may display an image through the second external electronic device 412. The electronic device 401 may be connected to the fourth external electronic device 414 through a third connection 1623. The electronic device 401 may receive a user input through the fourth external electronic device 414.

If the electronic device 401 is connected to a plurality of external electronic devices, connections associated with the plurality of external electronic devices may correspond to different profiles, respectively. Referring to FIG. 16, the first connection 1621 may correspond to a hands-free profile (HFP), the second connection 1622 may correspond to a basic image profile (BIP), and the third connection 1623 may correspond to a human interface device (HID) profile. For example, the user 599 may view an image using the second external electronic device 412 while performing a call using the first external electronic device 411. The user 599 may use the fourth external electronic device 414 to perform an input for an image to be displayed on the second external electronic device 412.

In an example, the electronic device 401 may determine whether to switch the connections based on the service of the external electronic device. For example, while providing a first service through the first external electronic device 411, the electronic device 401 may receive a user input requesting a connection to the second external electronic device 412. If the user input indicates that the first service is to be provided using the second external electronic device 412, the electronic device 401 may provide the first service using the second external electronic device 412 instead of the first external electronic device 411. In this case, after switching to the connection to the second external electronic device 412 is performed, the electronic device 401 may release the connection to the first external electronic device 411. If the user input indicates that a second service is to be provided using the second external electronic device 412, the electronic device 401 may provide the second service using the second external electronic device 412. In this case, the electronic device 401 may maintain the connection to the first external electronic device 411.

Figure 17:
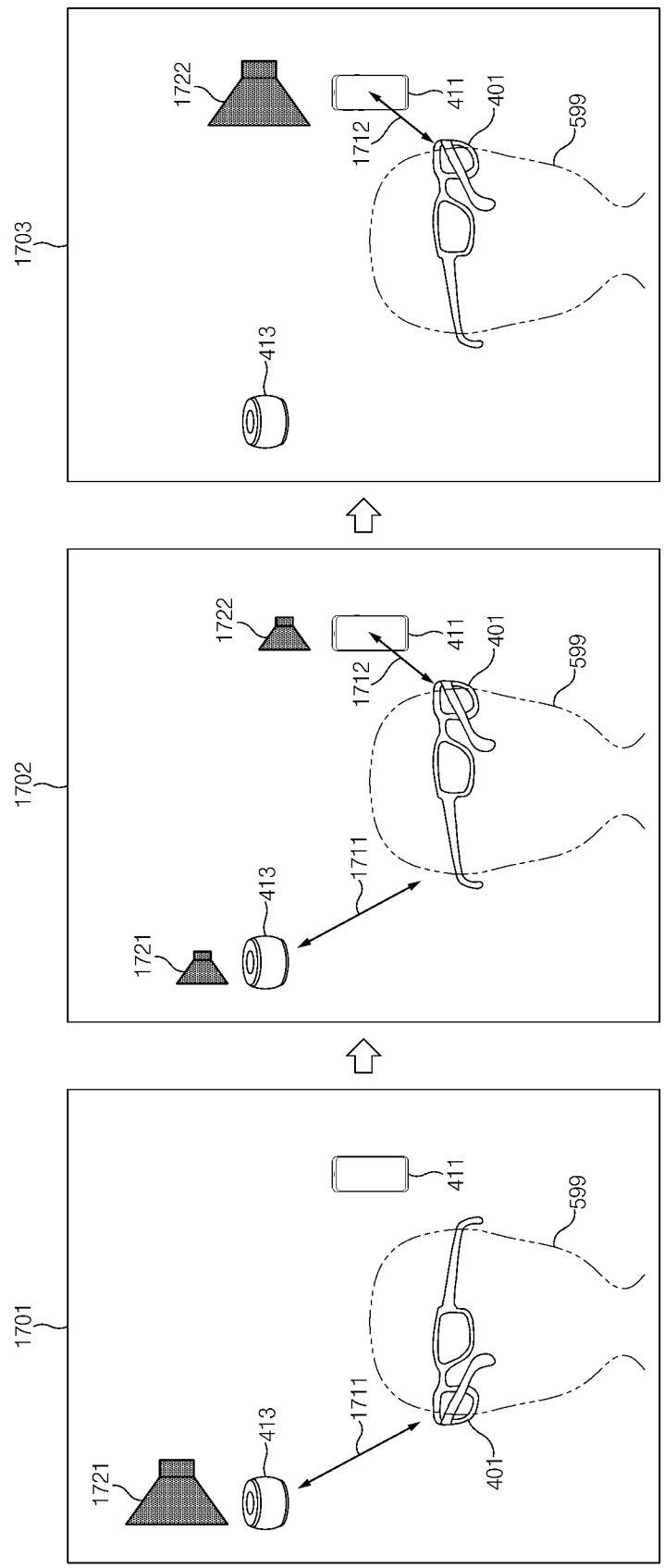
FIG. 17 is a diagram illustrating example connection switching according to various embodiments.

FIG. 17 is a diagram illustrating example connection switching according to various embodiments.

According to an embodiment, the electronic device 401 may gradually perform connection switching. For example, the electronic device 401 may gradually perform media output between two devices that are switched to a connection. The electronic device 401 may perform gradual connection switching by decreasing the output volume of the previous device and simultaneously increasing the output volume of the device to be switched to the connection. The electronic device 401 may perform gradual connection switching by decreasing the size of the output image on the previous device and simultaneously increasing the size of the output image on the device to be switched to the connection. The electronic device 401 may perform gradual connection switching by increasing the transparency of the output image on the previous device and simultaneously increasing the transparency of the output image on the device to be switched to the connection.

With reference to reference number 1701, the electronic device 401 may be connected to the third external electronic device 413 through a first connection 1711. The electronic device 401 may output audio content through the third external electronic device 413. For example, the electronic device 401 may output the audio content by setting a volume 1721 of the third external electronic device 413 to a first value.

With reference to reference number 1702, the electronic device 401 may identify the first external electronic device 411 as the gaze-corresponding external electronic device. The electronic device 401 may be connected to the first external electronic device 411 through the second connection 1712 based on the gaze of the user. As the gaze of the user to the first external electronic device 411 is maintained, the electronic device 401 may output the audio content while increasing the volume 1722 of the first external electronic device 411. As the gaze of the user to the first external electronic device 411 is maintained, the electronic device 401 may output the audio content while decreasing the volume 1721 of the third external electronic device 413. For example, the electronic device 401 may decrease the volume 1721 of the third external electronic device 413 from the first value to a second value.

With reference to reference number 1703, the electronic device 401 may output audio content through the first external electronic device 411. As the gaze of the user to the first external electronic device 411 is maintained for a specified time or longer, the electronic device 401 may release the first connection 1711 to the third external electronic device 413. The electronic device 401 may stop outputting the audio content through the first external electronic device 411 if the gaze of the user to the first external electronic device 411 is not maintained for the specified time or longer.

Although the volume has been described as being gradually increased/decreased in FIG. 17, embodiments of the present disclosure are not limited thereto. For example, at reference numeral 1702, the electronic device 401 may maintain a volume value of the third external electronic device 413. The electronic device 401 may maintain a fixed volume value until the connection switching of the first external electronic device 411 is completed. The electronic device 401 may provide a preview by playing the audio content at a low volume using the first external electronic device 411 during the connection switching to the first external electronic device 411.

In FIG. 17, connection switching between external electronic devices has been described; however, embodiments of the present disclosure are not limited thereto. For example, the electronic device 401 may switch the content playback device in a similar manner. The electronic device 401 may play the content being played through the electronic device 401 on another external electronic device in a similar manner. If the electronic device 401 is playing audio content in the electronic device 401, the electronic device 401 may select an external electronic device based on the gaze of the user and play the audio content through the selected external electronic device. For example, as described above with reference to FIG. 17, the electronic device 401 may provide a preview through the selected external electronic device. If the switching to the selected external electronic device is completed, the electronic device 401 may stop playing the audio content in the electronic device 401 and play the audio content through the selected external electronic device.

Figure 18:
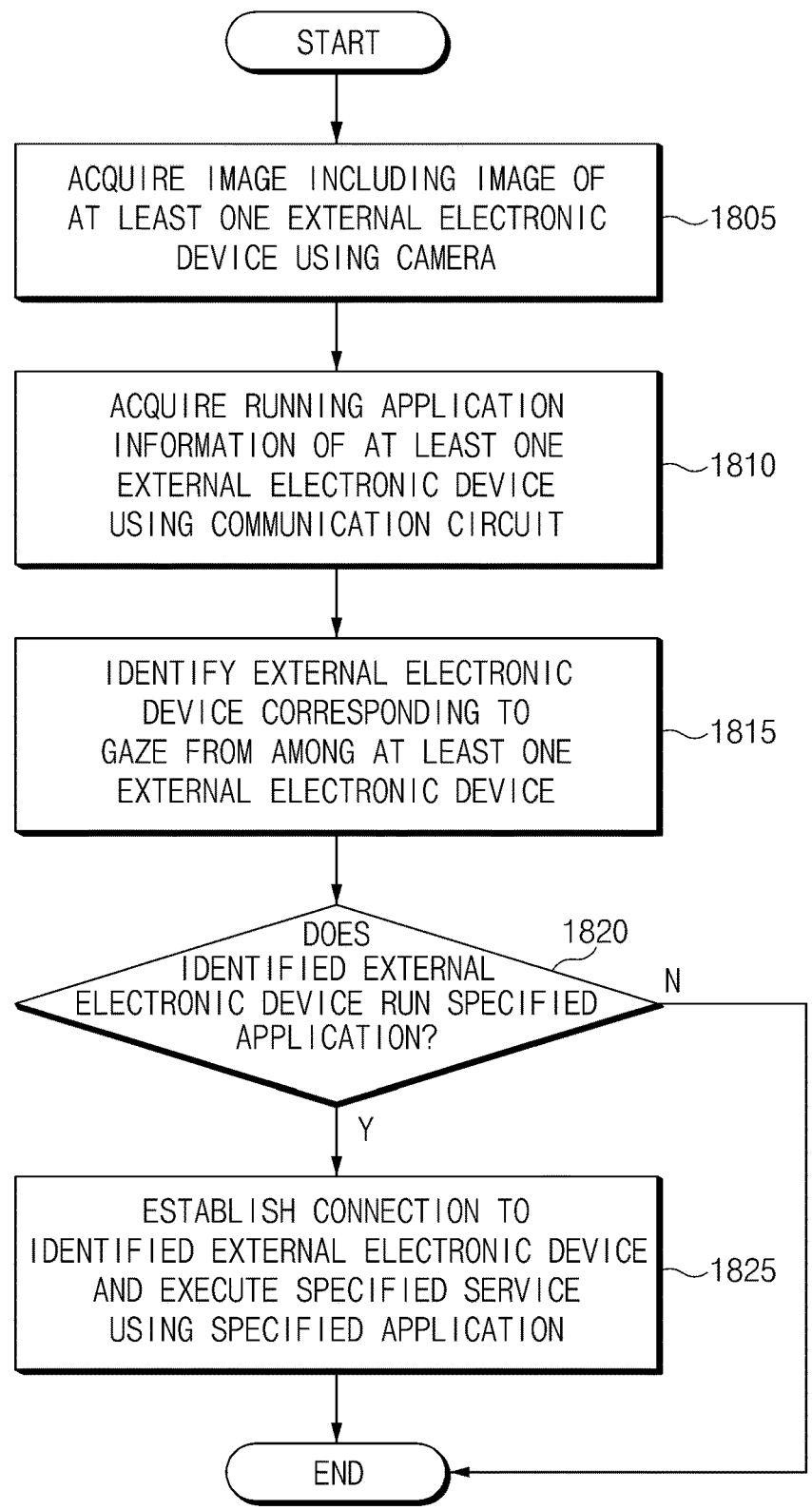
FIG. 18 is a flowchart illustrating an example method for connection according to various embodiments.

FIG. 18 is a flowchart illustrating an example method for connection according to various embodiments.

In operation 1805, the processor 420 may acquire an image including an image of at least one external electronic device using the camera 480. For example, the image may include a two-dimensional image, a depth map, and/or a three-dimensional image. The camera 480 may be configured to acquire an image corresponding to the field of view of the user of the electronic device 401.

In operation 1810, the processor 420 may acquire running application information of the at least one external electronic device using the communication circuit 490. For example, the processor 420 may receive a signal (e.g., advertisement) including running application information from at least one external electronic device through the communication circuit 490. The signal may be periodically transmitted by the external electronic device or may be transmitted in response to a request from the electronic device 401. For another example, the processor 420 may receive running application information of the external electronic device from the external server.

In operation 1815, the processor 420 may identify an external electronic device corresponding to the gaze of the user from among the at least one external electronic device. For example, the processor 420 may identify an external electronic device corresponding to a center of the image acquired using the camera 480 or an external electronic device corresponding to the largest area in the image. For example, the processor 420 may detect the gaze of the user using the sensor circuit 470 and identify an external electronic device corresponding to the detected gaze of the user.

In operation 1820, the processor 420 may determine whether the identified external electronic device runs the specified application. The processor 420 may determine whether the external electronic device is running the specified application using the running application information acquired using the communication circuit 490. For example, the specified application may be an application capable of outputting the content currently being provided by the electronic device 401. For example, the specified application may be an application capable of providing a service in conjunction with the electronic device 401.

If the identified external electronic device is running the specified application (e.g., Y in operation 1820), in operation 1825, the processor 420 may connect to the identified external electronic device and execute a specified service using the specified application. For example, the processor 420 may perform operation 1825 based on a user input for requesting the connection to the identified external electronic device (e.g., at least one of an input to a button, an input to the controller connected to the electronic device 401, a voice input, or a gesture input). The processor 420 may display information on the identified external electronic device using the display 460 and connect to the external electronic device based on reception of the user input. For example, the processor 420 may connect with the external electronic device based on the gaze of the user maintained on the identified external electronic device for a specified time or longer.

After the connection to the identified external electronic device, the processor 420 may output content of the electronic device 401 using the connected external electronic device. For example, before the connection to the external electronic device, the processor 420 may output the content through another external electronic device. In this case, the specified application may include an application supporting output of content. In addition, if the content is audio content, the processor 420 may provide a preview of the audio content by playing the audio content through the connected external electronic device. If the gaze of the user is maintained on the external electronic device for a specified time or longer after the connection to the external electronic device, the processor 420 may release the connection to the second external electronic device.

If the identified external electronic device is not running the specified application (e.g., N in operation 1820), the processor 420 may determine that connection to the identified external electronic device is not possible. In this case, the processor 420 may not display information on the identified external electronic device.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An augmented reality (AR) glasses device comprising:
   a camera;
   a display;
   a communication circuit;
   a memory storing images of a plurality of external electronic devices; and
   at least one processor connected to the camera, the display, the communication circuit, and the memory,
   wherein the processor is configured to control the AR glasses device to:
   acquire an image including a plurality of external electronic devices using the camera;
   acquire running application information of the plurality of external electronic devices using the communication circuit;
   identify a first external electronic device corresponding to a gaze from among the plurality of external electronic devices included in the acquired image;
   after identifying the first external electronic device, determine whether a specified application is running in the first external electronic device from among applications running on the first external electronic device based on the running application information;
   based on determining that the specified application is running in the first external electronic device, connect to the first external electronic device using the communication circuit; and
   output content of the AR glasses device using the first external electronic device, based on the connection to the first external electronic device,
   wherein the content includes audio content and the specified application includes an application supporting the output of the audio content.

2. The AR glasses device of claim 1, wherein the at least one processor is configured to identify the first external electronic device corresponding to the gaze from among the plurality of external electronic devices based on a center of the acquired image or an image size of the first external electronic device in the acquired image.

3. The AR glasses device of claim 1, further comprising an eye-tracking sensor, wherein the at least one processor is configured to identify the first external electronic device corresponding to the gaze using the eye-tracking sensor.

4. The AR glasses device of claim 1, wherein the at least one processor is configured to identify the first external electronic device by comparing the acquired image with the images in the memory.

5. The AR glasses device of claim 4, wherein the at least one processor is configured to, after identifying the first external electronic device, control the AR glasses device to display running application information associated with the first external electronic device using the display.

6. The AR glasses device of claim 1, wherein the at least one processor is configured to control the AR glasses device to connect to the first external electronic device based on receiving an input for selecting the first external electronic device, wherein
   the input includes at least one of an input to a button of the AR glasses device, an input to a controller connected to the AR glasses device, a voice input, or a gesture input.

7. The AR glasses device of claim 1, wherein the at least one processor is configured to:
   output the content through a second external electronic device, before the connection to the first external electronic device; and
   connect to the first external electronic device based on the gaze during the output of the content through the second external electronic device.

8. The AR glasses device of claim 7, wherein the specified application includes an application supporting the output of the content.

9. The AR glasses device of claim 7, wherein the content includes audio content, and
   the at least one processor is configured to control the AR glasses device to:
   provide a preview of the audio content by playing the audio content through the first external electronic device, based on being connected to the first external electronic device; and
   release the connection to the second external electronic device based on the gaze to the first external electronic device being maintained for a specified time or longer after the connection to the first external electronic device.

10. A method for operating an AR glasses device, comprising:
    acquiring an image corresponding to a gaze direction using a camera of the AR glasses device, the image including a plurality of external electronic devices;
    acquiring running application information of the plurality of external electronic devices using a communication circuit of the AR glasses device;
    identifying a first external electronic device corresponding to a gaze from among the plurality of external electronic devices included in the acquired image;
    after identifying the first external electronic device, determining whether a specified application is running in the first external electronic device from among applications running on the first external electronic device based on the running application information; and
    based on determining that the specified application is running in the first external electronic device, connecting to the first external electronic device using the communication circuit; and outputting content of the AR glasses device using the first external electronic device, based on the connection to the first external electronic device, wherein the content includes audio content and the specified application includes an application supporting the output of the audio content.

11. The method of claim 10, wherein the identifying of the first external electronic device includes identifying the first external electronic device corresponding to the gaze from among the plurality of external electronic devices based on a center of the acquired image or an image size of the first external electronic device in the acquired image.

12. The method of claim 10, wherein the identifying of the first external electronic device includes identifying the first external electronic device corresponding to the gaze using an eye-tracking sensor of the AR glasses device.

13. The method of claim 10, wherein the identifying of the first external electronic device includes identifying the first external electronic device by comparing the acquired image with images of a plurality of external electronic devices stored in a memory of the AR glasses device.

14. The method of claim 13, further comprising, after identifying the first external electronic device, displaying running application information associated with the first external electronic device.

15. The method of claim 10, wherein the connecting to the first external electronic device includes connecting to the first external electronic device based on receiving an input for selecting the first external electronic device, wherein the input includes at least one of an input to a button of the AR glasses device, an input to a controller connected to the AR glasses device, a voice input, or a gesture input.

16. The method of claim 10, further comprising outputting the content through a second external electronic device, before the connection to the first external electronic device, wherein the connecting to the first external electronic device includes connecting to the first external electronic device based on the gaze during the output of the content through the second external electronic device.

17. The method of claim 16, wherein the specified application includes an application supporting the output of the content.

18. The method of claim 17, wherein the content includes audio content, and the method further comprises:

providing a preview of the audio content by playing the audio content through the first external electronic device, based on being connected to the first external electronic device; and releasing the connection to the second external electronic device based on the gaze to the first external electronic device being maintained for a specified time or longer after the connection to the first external electronic device.

* * * * *